(12) United States Patent
Komatsu et al.

(10) Patent No.: US 10,899,022 B2
(45) Date of Patent: Jan. 26, 2021

(54) SENSOR DEVICE HAVING A FORCE DETECTION ELEMENT SANDWICHED BY TWO SENSOR SIGNAL PROCESSING CIRCUITS

(71) Applicant: Seiko Epson Corporation, Tokyo (JP)

(72) Inventors: Hiroshi Komatsu, Shimosuwa (JP); Hiroki Kawai, Matsumoto (JP); Mitsuhiro Tateyama, Minowa (JP); Hideo Miyasaka, Okaya (JP)

(73) Assignee: Seiko Epson Corporation

( * ) Notice: Subject to any disclaimer, the term of this patent is extended or adjusted under 35 U.S.C. 154(b) by 50 days.

(21) Appl. No.: 16/286,805

(22) Filed: Feb. 27, 2019

(65) Prior Publication Data
US 2019/0263008 A1    Aug. 29, 2019

(30) Foreign Application Priority Data

Feb. 28, 2018  (JP) .................................. 2018-035892

(51) Int. Cl.
| | |
|---|---|
| *G01L 5/16* | (2020.01) |
| *B25J 19/02* | (2006.01) |
| *G01L 5/22* | (2006.01) |
| *G01L 5/167* | (2020.01) |

(52) U.S. Cl.
CPC .............. *B25J 19/028* (2013.01); *G01L 5/167* (2013.01); *G01L 5/226* (2013.01)

(58) Field of Classification Search
CPC ......... G01L 5/226; G01L 5/228; G01L 5/009; G01L 5/161; G01L 5/16; G01L 5/167
See application file for complete search history.

(56) References Cited

U.S. PATENT DOCUMENTS

| | | | | |
|---|---|---|---|---|
| 7,739,906 B2* | 6/2010 | Hatanaka | ............. | G01D 11/245 73/146 |
| 8,869,632 B2* | 10/2014 | Tsuchiya | ................ | B25J 13/085 73/862.59 |
| 9,677,953 B2* | 6/2017 | Kamiya | ..................... | G01L 1/16 |
| 9,705,069 B2* | 7/2017 | Matsuzawa | ......... | H01L 41/1132 |
| 9,770,826 B2* | 9/2017 | Kamiya | .................. | G01P 15/18 |
| 9,931,752 B2* | 4/2018 | Matsuzawa | ............. | G01L 5/009 |
| 2014/0053660 A1 | 2/2014 | Kamiya et al. | | |
| 2017/0090511 A1* | 3/2017 | Rudolph | ................ | G04G 17/06 |

FOREIGN PATENT DOCUMENTS

| | | |
|---|---|---|
| JP | 2000-314744 A | 11/2000 |
| JP | 2014-041038 A | 3/2014 |

* cited by examiner

*Primary Examiner* — Tran M. Tran
(74) *Attorney, Agent, or Firm* — Harness, Dickey & Pierce, P.L.C.

(57) ABSTRACT

A sensor device includes a base body including a recess, a lid body configured to close an opening of the recess, a force detection element disposed in the recess and including a first element that outputs a first signal according to an external force in a first axis and a second element that stacks on the first element and outputs a second signal according to an external force in a second axis; a first circuit disposed in the recess and configured to process the first signal, and a second circuit disposed in the recess and configured to process the second signal.

20 Claims, 16 Drawing Sheets

FIG. 16
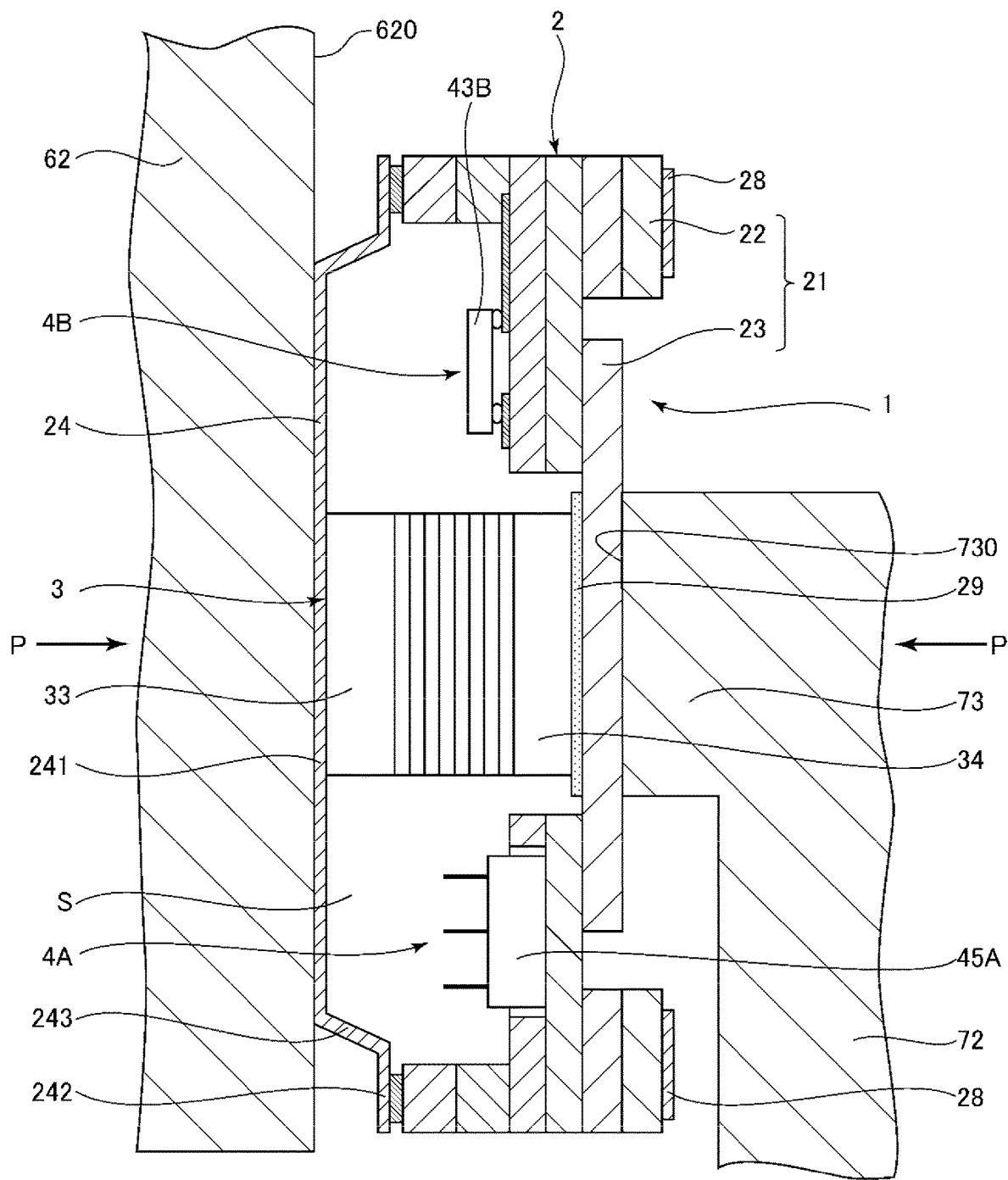
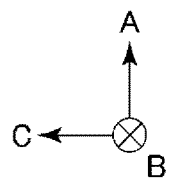

SENSOR DEVICE HAVING A FORCE DETECTION ELEMENT SANDWICHED BY TWO SENSOR SIGNAL PROCESSING CIRCUITS

BACKGROUND

1. Technical Field

The present invention relates to a sensor device, a force detecting device, and a robot.

2. Related Art

A sensor device described in JP-A-2000-314744 (Patent Literature 1) is an acceleration sensor that can detect accelerations of an X axis, a Y axis, and a Z axis independently from one another. The sensor device includes a sensor base, a circuit board attached to the sensor base, a laminated piezoelectric element attached to the circuit board, and a processing circuit that processes a signal output from the laminated piezoelectric element.

Such an acceleration sensor needs to include, in order to detect accelerations of an X axis, a Y axis, and a Z axis independently from one another, as a processing circuit, an X-axis processing circuit that detects acceleration in an X-axis direction on the basis of the signal output from the laminated piezoelectric element, a Y-axis processing circuit that detects acceleration in a Y-axis direction on the basis of the signal output from the laminated piezoelectric element, and a Z-axis processing circuit that detects acceleration in a Z-axis direction on the basis of the signal output from the laminated piezoelectric element.

However, in Patent Literature 1, referring to FIG. 5, a plurality of piezoelectric elements for multi-axis detection are disposed on a substrate. Signal processing circuits for the piezoelectric elements are disposed on another substrate serving as a second story built on a substrate on which the piezoelectric elements are disposed.

When the signal processing circuits of the plurality of piezoelectric elements are disposed on the other substrate serving as the second story in this way, the signal processing circuits of the piezoelectric elements of a plurality of axes are disposed close to one another. It is more likely that signals of the axes output from the laminated piezoelectric element interfere with one another to be noise. Therefore, in the acceleration sensor of Patent Literature 1, an excellent acceleration detection characteristic cannot be exerted.

SUMMARY

An advantage of some aspects of the invention is to provide a sensor device, a force detecting device, and a robot that can exert an excellent detection characteristic for reducing signal interference in multi-axis detection.

A sensor device as an aspect of the invention includes: a base body including a recessed section; a lid body configured to close an opening of the recessed section and seal the recessed section; a force detection element disposed in the recessed section and including a first element that outputs a first signal according to an external force in a first direction and a second element that outputs a second signal according to an external force in a second direction different from the first direction; a first circuit disposed in the recessed section and configured to process the first signal; and a second circuit disposed in the recessed section and configured to process the second signal. In a plan view of the base body, the first circuit is located on one side of the first element and one side of the second element, which is a same side as the one side of the first element, and the second circuit is located on another side of the first element and another side of the second element, which is a same side as the other side of the first element.

With this configuration, the first circuit and the second circuit can be disposed to be separated from each other as much as possible in the recessed section. Therefore, interference between the first circuit and the second circuit is reduced. It is possible to effectively prevent noise from the second circuit from being superimposed on the first signal and, conversely, noise from the first circuit from being superimposed on the second signal. Therefore, it is possible to accurately process the first signal with the first circuit and accurately process the second signal with the second circuit. As a result, it is possible to obtain the sensor device that can accurately detect a received external force and exert an excellent force detection characteristic.

In the sensor device as the aspect of the invention, it is preferable that the sensor device includes: a first connection member configured to electrically connect a wire of the first circuit and the first element; and a second connection member configured to electrically connect a wire of the second circuit and the second element, and, in the plan view of the base body, when a direction in which the first circuit and the second circuit are arranged is represented as a first direction and a direction orthogonal to the first direction is represented as a second direction, the first connection member and the second connection member are arranged in the second direction.

With this configuration, the length in the first direction of the base body can be reduced. Therefore, a plan view shape of the base body can be formed in a shape similar to a square (desirably formed in a square shape). As a result, the force detection element can more uniformly receive an external force in the first direction and an external force in the second direction and more accurately detect the two external forces.

In the sensor device as the aspect of the invention, it is preferable that the sensor device includes: a first connection member configured to electrically connect a wire of the first circuit and the first element; and a second connection member configured to electrically connect a wire of the second circuit and the second element, the first element is a first piezoelectric element, the second element is a second piezoelectric element, the first piezoelectric element and the second piezoelectric element are stacked to form the force detection element, and, in the plan view of the base body, the first circuit and the second circuit are disposed in positions symmetrical with respect to a straight line passing a center of the force detection element, and the first connection member and the second connection member are located on a same side of a side extending in the second direction of the force detection element.

With this configuration, it is easy to symmetrically dispose the first circuit and the second circuit with respect to the force detection element.

In the sensor device as the aspect of the invention, it is preferable that the sensor device includes: a first connection member configured to electrically connect a wire of the first circuit and the first element; and a second connection member configured to electrically connect a wire of the second circuit and the second element, the first element is a first piezoelectric element, the second element is a second piezoelectric element, the first piezoelectric element and the second piezoelectric element are stacked to form the force detection element, and, in the plan view of the base body, the first circuit and the second circuit are disposed in positions point-symmetrical with respect to a center of the force detection element, and the first connection member is located on one side of a side extending in the second direction of the force detection element, and the second connection member is disposed on another side of the side extending in the second direction of the force detection element.

With this configuration, it is easy to point-symmetrically dispose the first circuit and the second circuit with respect to the force detection elements.

In the sensor device as the aspect of the invention, it is preferable that the first element outputs a first electric charge as the first signal, the second element outputs a second electric charge as the second signal, the first circuit is a circuit that converts the first electric charge into a voltage, and the second circuit is a circuit that converts the second electric charge into a voltage.

With this configuration, it is possible to easily detect an external force in the first direction and an external force in the second direction.

In the sensor device as the aspect of the invention, it is preferable that the first circuit includes at least one of a resistor to which the first electric charge is input, a charge accumulating section configured to accumulate the first electric charge, and an amplifier configured to amplify a voltage by the first electric charge, and the second circuit includes at least one of a resistor to which the second electric charge is input, a charge accumulating section configured to accumulate the second electric charge, and an amplifier that amplifies a voltage by the second electric charge.

With this configuration, the circuit elements are protected from moisture (humidity). The sensor device can prevent deterioration and fluctuation in circuit characteristics of the first circuit and the second circuit due to humidity and accurately detect a received external force.

In the sensor device as the aspect of the invention, it is preferable that the first piezoelectric element and the second piezoelectric element respectively include quartz.

With this configuration, the configuration of the first and second piezoelectric elements is simplified. The force detection element has excellent characteristics such as high sensitivity, a wide dynamic range, and high rigidity.

A force detecting device as another aspect of the invention includes: a first substrate; a second substrate; and the sensor device according to the aspect of the invention provided between the first substrate and the second substrate.

With such a force detecting device, since the force detecting device includes the sensor device according to the aspect of the invention, it is possible to more accurately detect external force.

A robot as still another aspect of the invention includes: a base; an arm connected to the base; and a force detecting device according to the aspect of the invention.

With such a robot, since the robot includes the force detecting device according to the aspect of the invention, it is possible to execute more precise work.

BRIEF DESCRIPTION OF THE DRAWINGS

The invention will be described with reference to the accompanying drawings, wherein like numbers reference like elements.

FIG. 16 is a sectional view of a sensor device disposed in the force detecting device.

DESCRIPTION OF EXEMPLARY EMBODIMENTS

Preferred embodiments of the invention with reference to a sensor device, a force detecting device and a robot are explained in detail below with reference to the accompanying drawings.

First Embodiment

A sensor device according to a first embodiment of the invention is explained.

Figure 1:
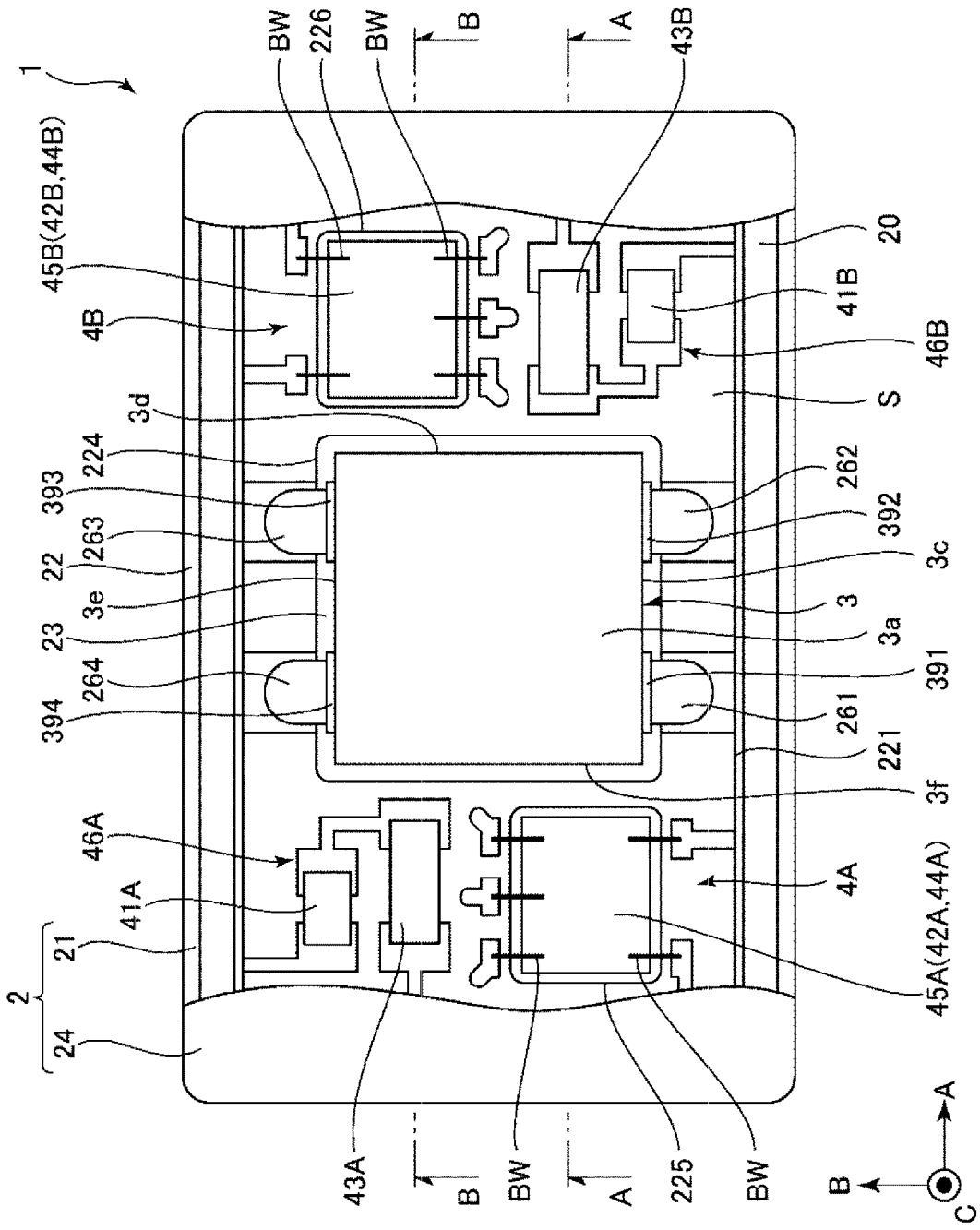
FIG. 1 is a plan view of a sensor device according to a first embodiment of the invention.
Figure 2:
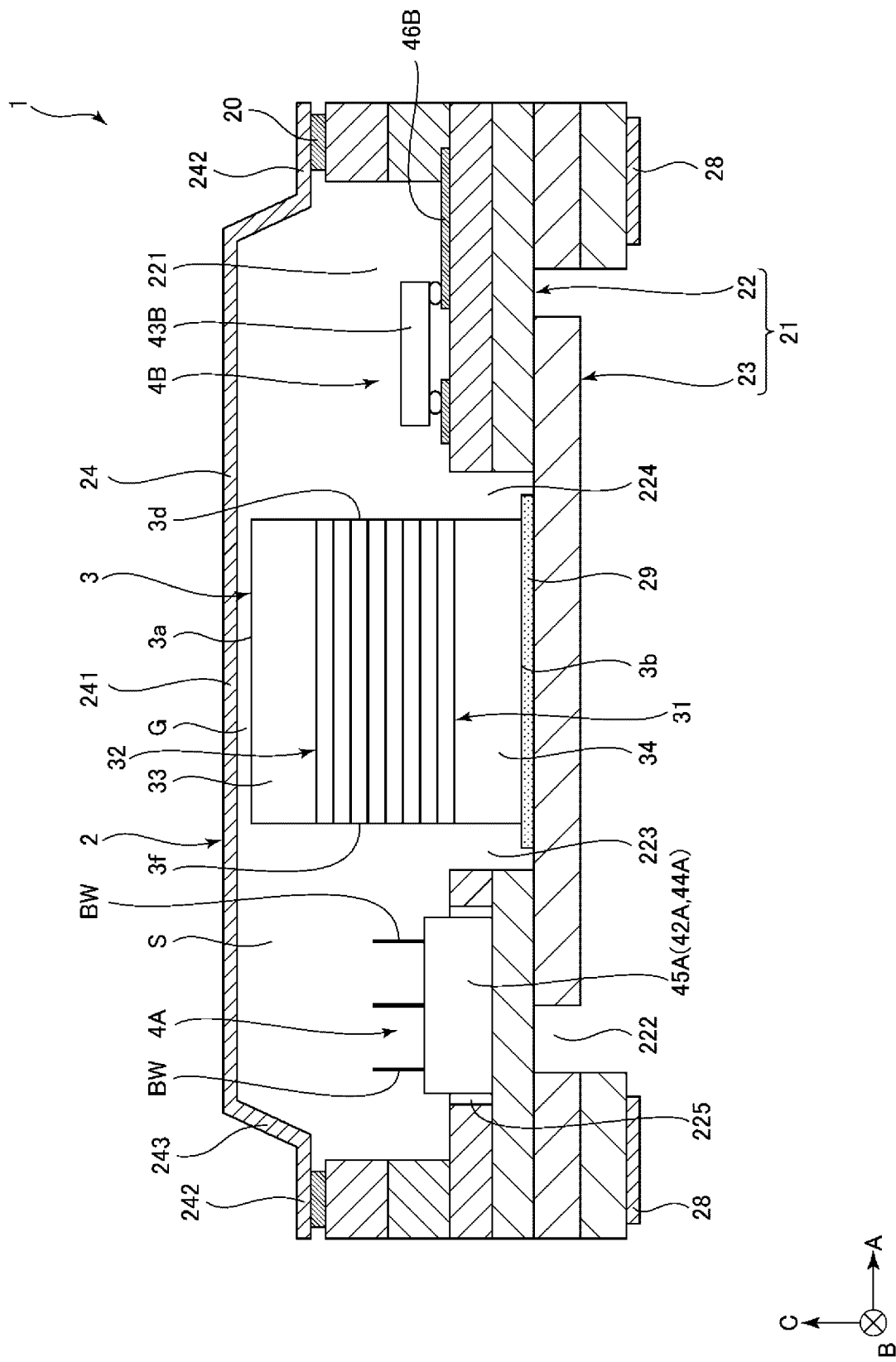
FIG. 2 is an A-A line sectional view in FIG. 1.
Figure 3:
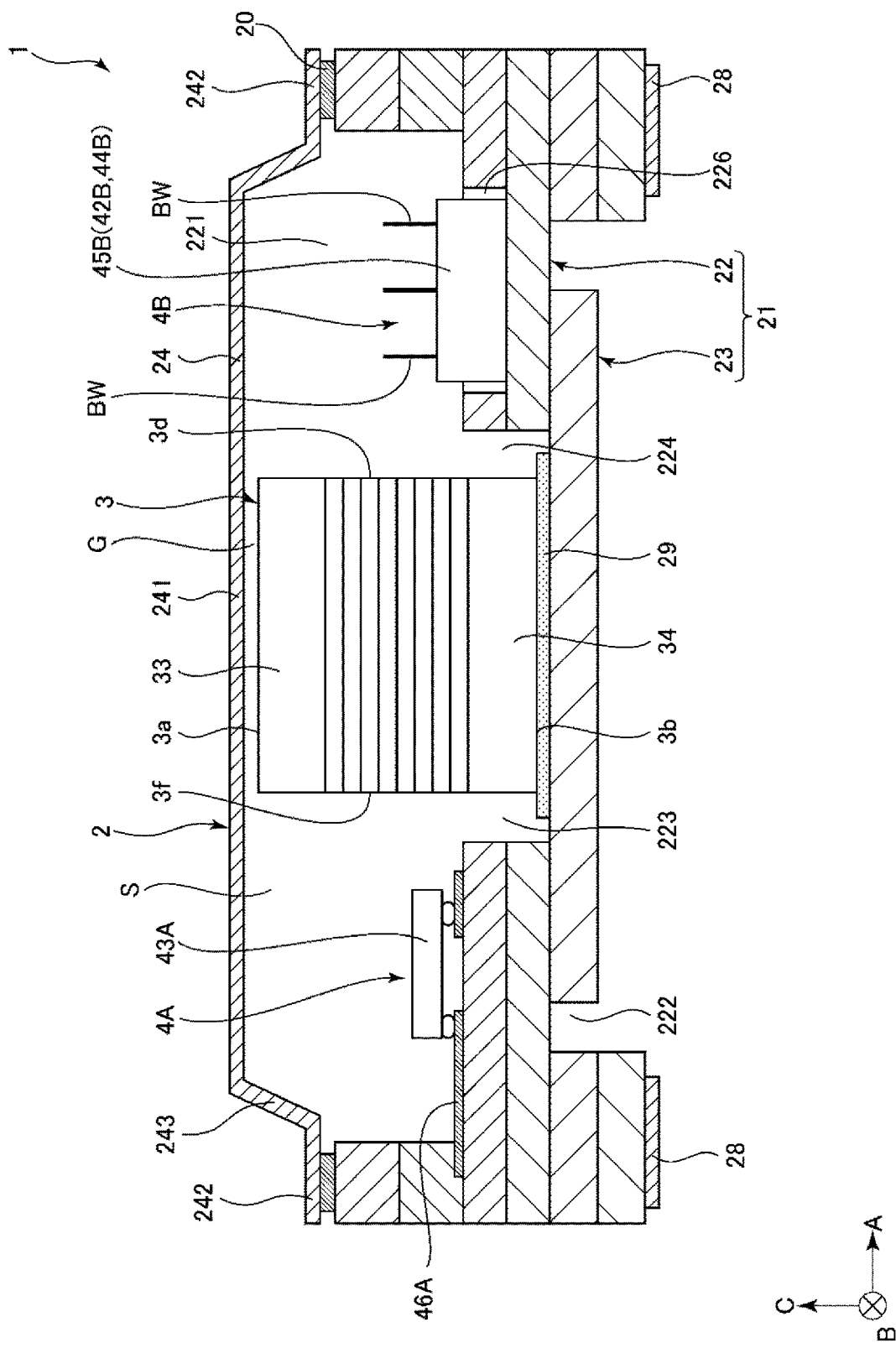
FIG. 3 is a B-B line sectional view in FIG. 1.
Figure 4:
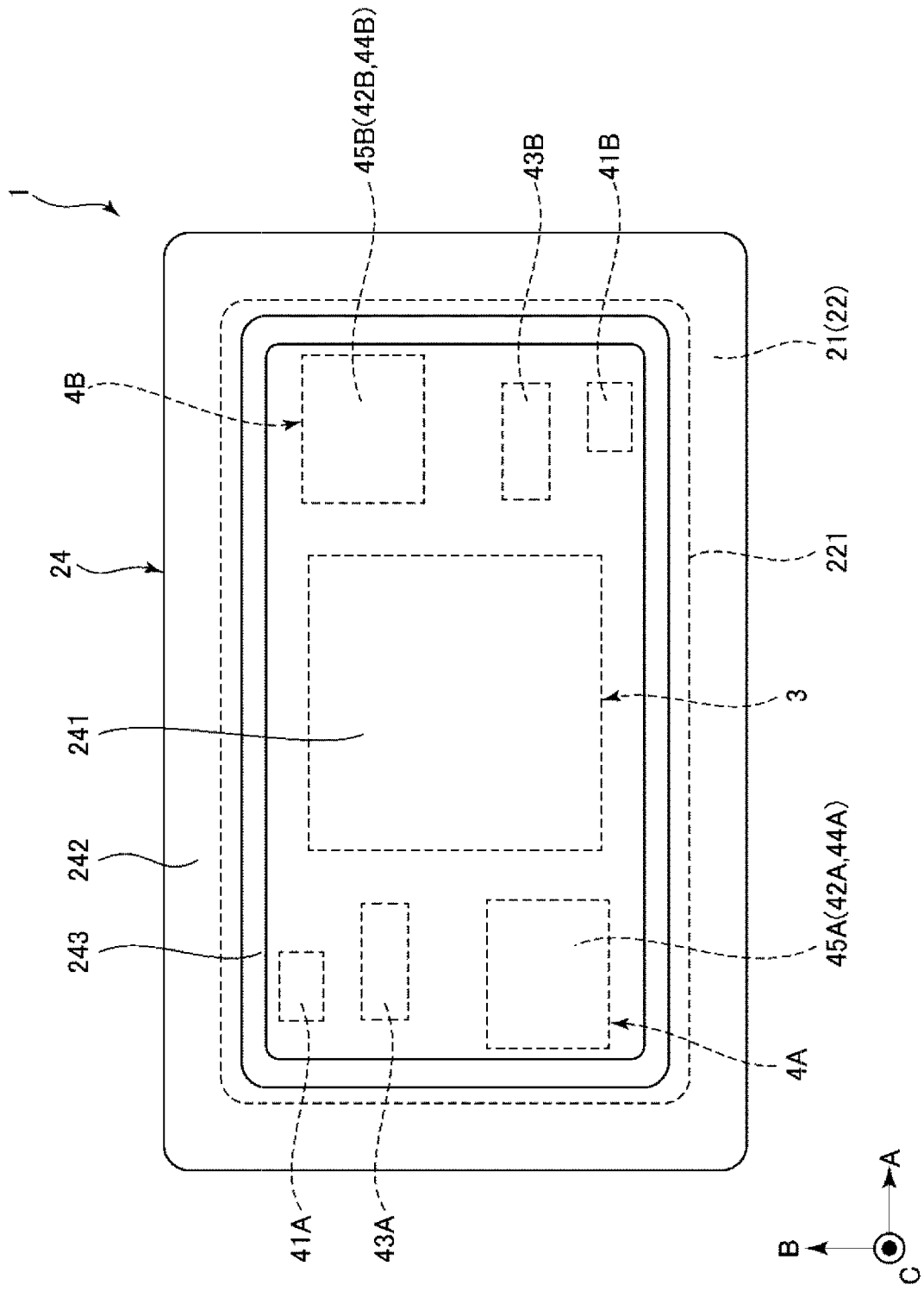
FIG. 4 is a plan view of the sensor device shown in FIG. 1.
Figure 5:
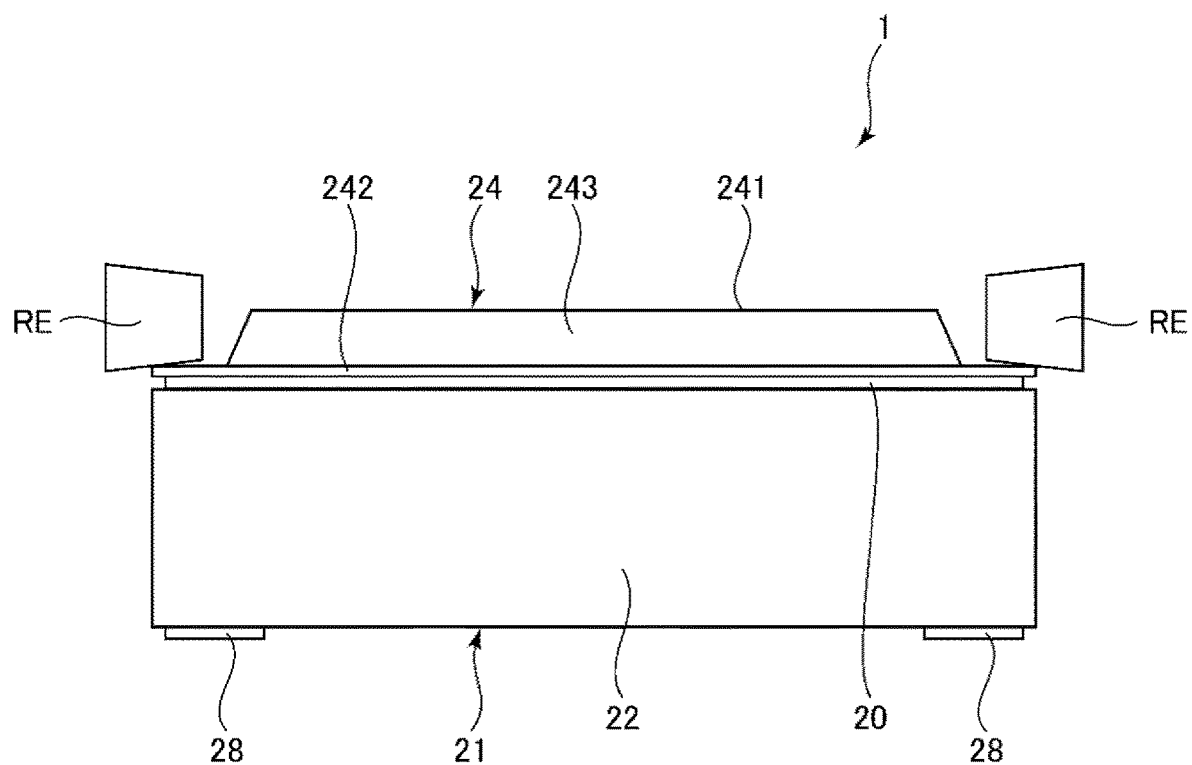
FIG. 5 is a side view showing a manufacturing method for the sensor device shown in FIG. 1.
Figure 6:
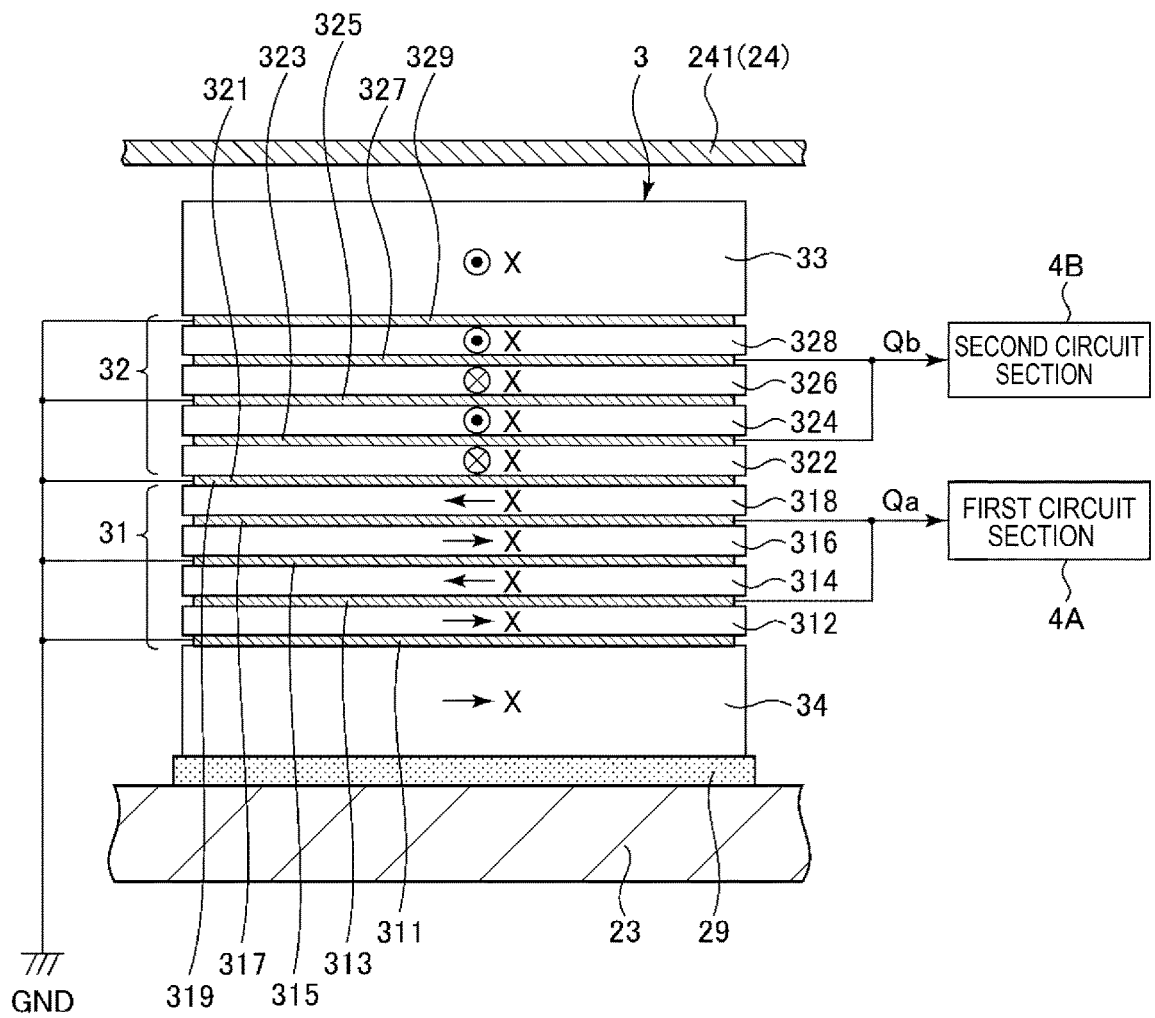
FIG. 6 is a sectional view of a force detection element included in the sensor device shown in FIG. 1.
Figure 7:
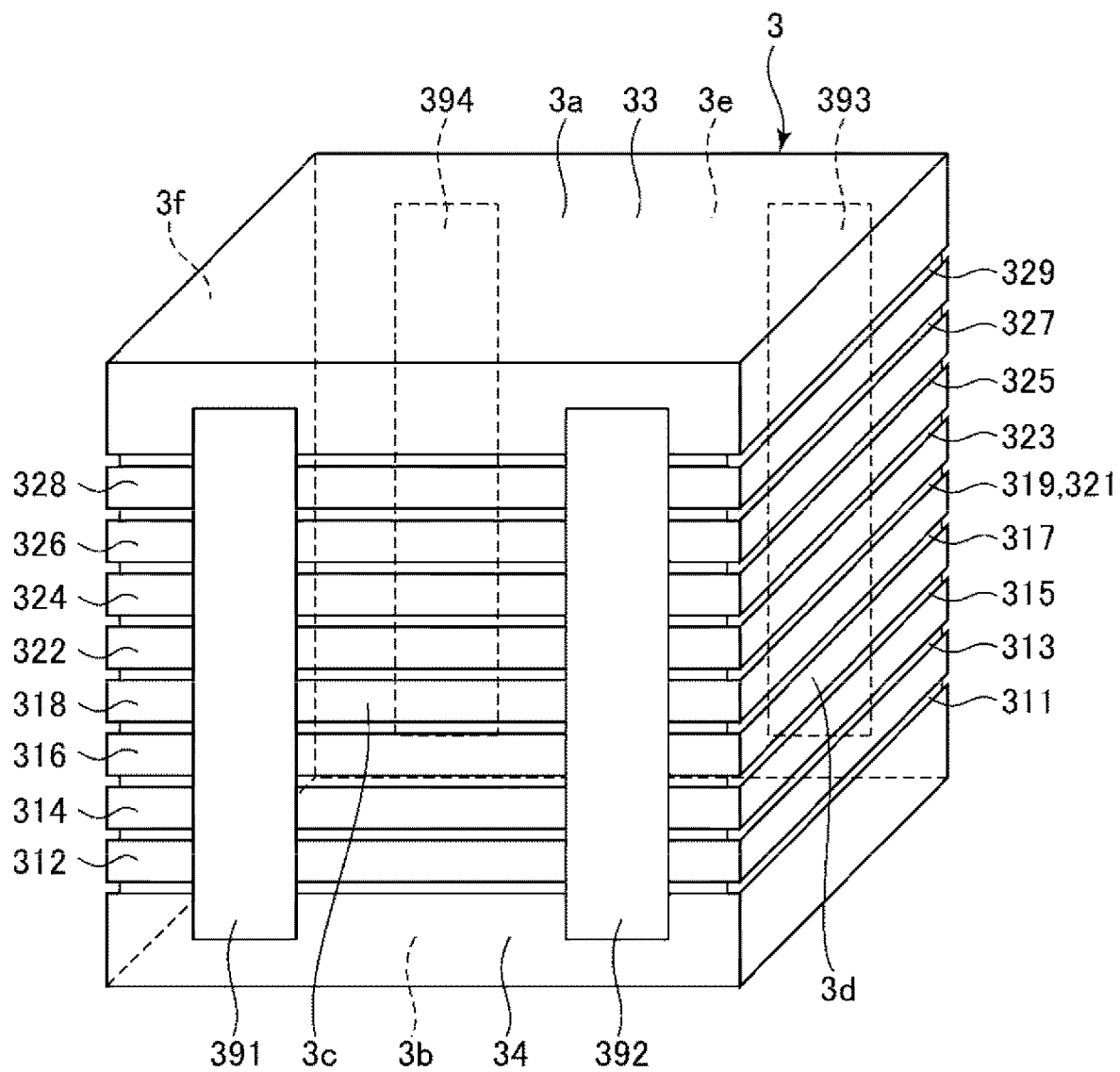
FIG. 7 is a perspective view of the force detection element shown in FIG. 6.
Figure 8:
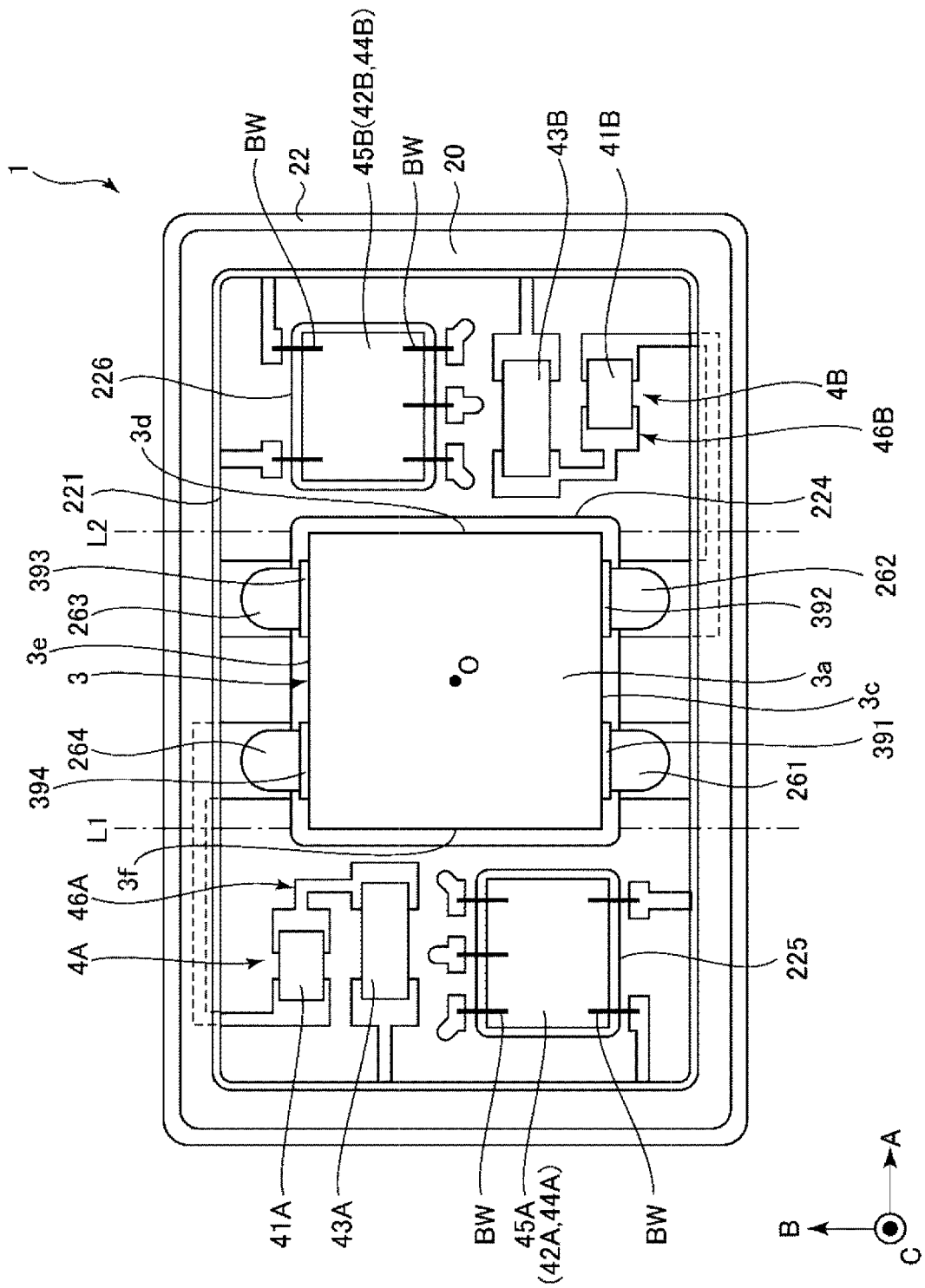
FIG. 8 is a plan view of the sensor device shown in FIG. 1.
Figure 9:
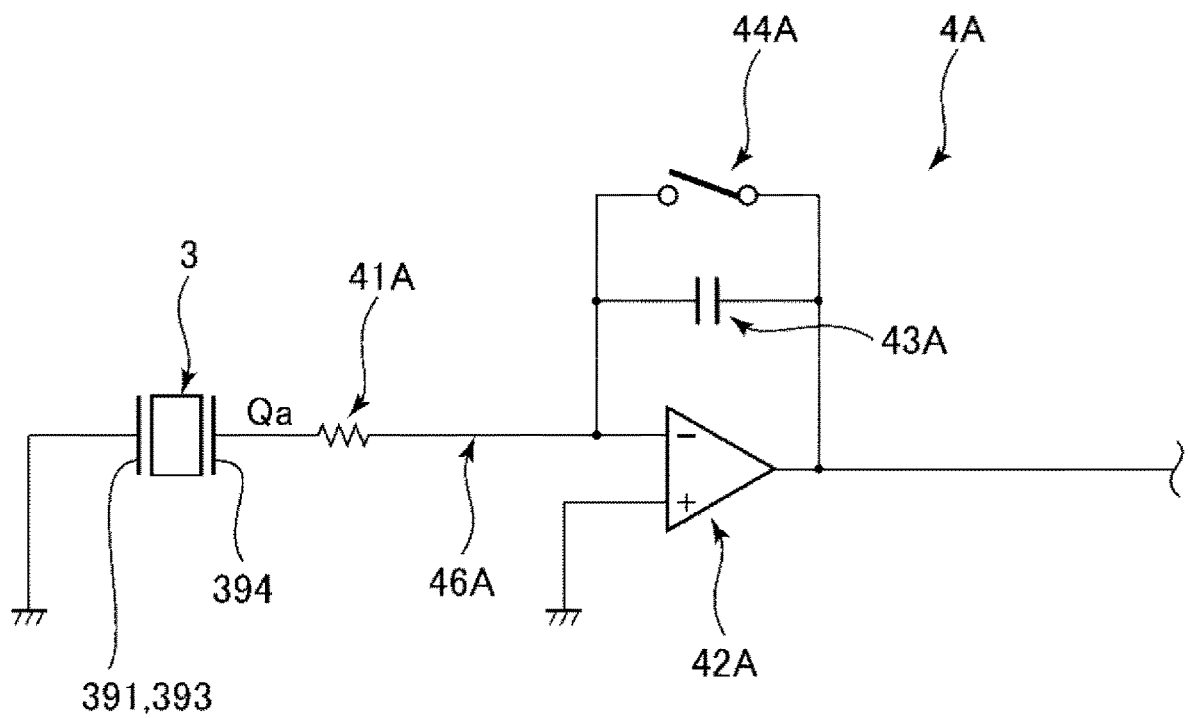
FIG. 9 is a circuit diagram of a first circuit included in the sensor device shown in FIG. 1.
Figure 10:
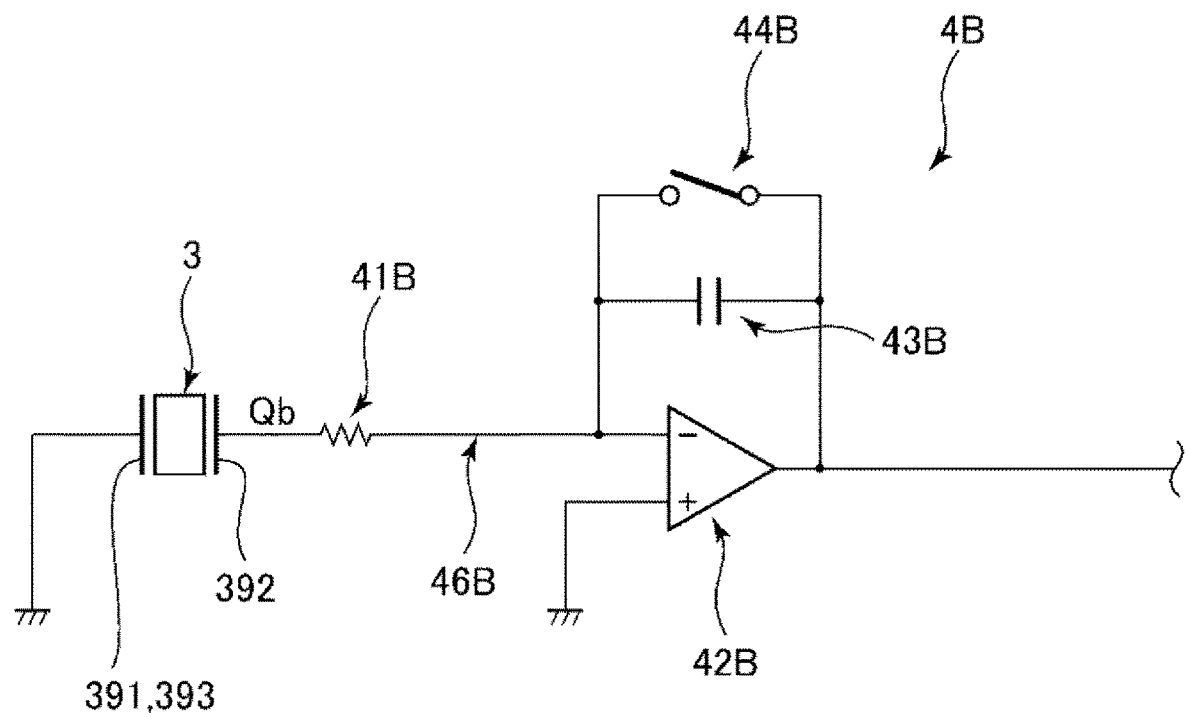
FIG. 10 is a circuit diagram of a second circuit included in the sensor device shown in FIG. 1.

FIG. 1 is a plan view of the sensor device according to the first embodiment of the invention. FIG. 2 is an A-A line sectional view in FIG. 1. FIG. 3 is a B-B line sectional view in FIG. 1. FIG. 4 is a plan view of the sensor device shown in FIG. 1. FIG. 5 is a side view showing a manufacturing method for the sensor device shown in FIG. 1. FIG. 6 is a sectional view of a force detection element included in the sensor device shown in FIG. 1. FIG. 7 is a perspective view of the force detection element shown in FIG. 6. FIG. 8 is a plan view of the sensor device shown in FIG. 1. FIG. 9 is a circuit diagram of a first circuit included in the sensor device shown in FIG. 1. FIG. 10 is a circuit diagram of a second circuit included in the sensor device shown in FIG. 1.

In the following explanation, for convenience of explanation, three axes orthogonal to one another are represented as an A axis, a B axis, and a C axis. The distal end sides of arrows indicating the axes are represented as a "plus side" and the proximal end sides of the arrows are represented as a "minus side". A direction parallel to the A axis is referred to as "A-axis direction (first direction)", a direction parallel to the B axis is referred to as "B-axis direction (second direction)", and a direction parallel to the C axis is referred to as "C-axis direction (third direction)". A C-axis direction plus side is referred to as "upper" as well and a C-axis direction minus side is referred to as "lower" as well. A view from the C-axis direction (a plan view of a base body 21) is referred to as "plan view" as well.

A sensor device 1 shown in FIG. 1 includes a package 2, and a force detection element 3 and a first circuit 4A and a second circuit 4B housed in the package 2. For example, like a force detecting device 100 explained below, such a sensor device 1 is used in a state in which the sensor device 1 is sandwiched from the C-axis direction and the force detection element 3 is preloaded. An external force (a shearing force in the A-axis direction and a shearing force in the B-axis direction) applied to the sensor device 1 is transmitted to the force detection element 3 via the package 2. A signal based on the received external force is output from the force detection element 3. The output signal is processed by the first circuit 4A and the second circuit 4B.

In this embodiment, as the force detection element 3, a configuration formed by stacking a piezoelectric element 31 (a first piezoelectric element) and a piezoelectric element 32 (a second piezoelectric element) explained below is illustrated. However, not only this, but a first element and a second element that output electric charges with an external force may be respectively independently disposed in the sensor device.

In the plan view, the package 2 is formed in a substantially rectangular shape having the A-axis direction as a major axis and having the B-axis direction as a minor axis. The package 2 includes a base body 21 and a lid body 24 joined to the base body 21. A hermetical housing space S is formed on the inner side of the package 2. The force detection element 3, the first circuit 4A, and the second circuit 4B are respectively housed in the housing space S. By housing the force detection element 3, the first circuit 4A, and the second circuit 4B in the package 2 in this way, these sections can be protected (dustproofed and waterproofed) from the outside world. In particular, by protecting the first and second circuits 4A and 4B from moisture (humidity), it is possible to prevent deterioration and fluctuation of characteristics of the first and second circuits 4A and 4B due to moisture.

An atmosphere in the housing space S is not particularly limited but is desirably a vacuum state or a state (a decompressed state) close to the vacuum state. Specifically, the housing space S desirably has pressure of 0.01 Pa or more and 1000 Pa or less. Consequently, it is possible to effectively prevent deterioration and fluctuation in the characteristics of the first and second circuits 4A and 4B. However, besides the vacuum state, the housing space S may be replaced with an inert gas such as nitrogen, argon, or helium.

As shown in FIGS. 2 and 3, the base body 21 includes a base section 22 and a bottom member 23. The base section 22 includes a recessed section (a recess) 221 opened to an upper surface, a recessed section 222 opened to a lower surface, and a through-hole 223 configured to pierce through the centers of the bottom surfaces of the recessed sections 221 and 222. The bottom member 23 is formed in a plate shape and is joined to the bottom surface of the recessed section 222 to close a lower side opening of the through-hole 223. Therefore, a recessed section 224 opened in the center of the bottom surface of the recessed section 221 is formed by the through-hole 223 and the bottom member 23. The force detection element 3 is disposed to be inserted into the recessed section 224. A lower surface 3b of the force detection element 3 is joined to the upper surface of the bottom member 23 via an adhesive 29.

As shown in FIG. 2, the base section 22 includes a recessed section 225 located on an A-axis direction minus side of the recessed section 224 and opened on the bottom surface of the recessed section 221. A circuit element 45A included in the first circuit 4A is disposed in the recessed section 225. As shown in FIG. 3, the base section 22 includes a recessed section 226 located on an A-axis direction plus side of the recessed section 224 and opened on the bottom surface of the recessed section 221. A circuit element 45B included in the second circuit 4B is disposed in the recessed section 226. As explained below, the circuit elements 45A and 45B are high (thick) compared with other circuit elements included in the first and second circuits 4A and 4B. Therefore, by forming recessed sections 225 and 226 in the base body 21 and disposing the circuit elements 45A and 45B in the recessed sections 225 and 226, it is possible to achieve a reduction in the height of the package 2.

As shown in FIG. 1, in the base section 22, a wire 46A included in the first circuit 4A and a wire 46B included in the second circuit 4B are provided. At least parts of the respective wires 46A and 46B are disposed on the bottom surface of the recessed section 221. As shown in FIGS. 2 and 3, a plurality of external terminals 28 exposed to the outside of the package 2 and electrically connected to the first circuit 4A and the second circuit 4B are provided on the bottom surface of the base section 22.

A constituent material of the base section 22 is desirably a material having insulation. The constituent material desirably includes, as main components, oxide-based ceramic such as alumina and zirconia, carbide-based ceramics such as silicon carbide, and nitride-based ceramics such as silicon nitride. Consequently, the base section 22 has proper rigidity and is excellent in insulation. Therefore, damage due to deformation of the package 2 less easily occurs. It is possible to more surely protect the force detection element 3 and the first and second circuits 4A and 4B housed on the inside of the package 2.

A constituent material of the bottom member 23 is not particularly limited. Examples of the constituent material include various metal materials such as stainless steel, Kovar, copper, iron, carbon steel, and titanium. In particular, the constituent material is desirably Kovar. Consequently, the bottom member 23 has relatively high rigidity and is properly elastically deformed when stress is applied thereto. Therefore, it is possible to accurately transmit an external force to the force detection element 3 via the bottom member 23 and reduce likelihood of breakage of the bottom member 23 by the external force. Kovar has a coefficient of thermal expansion relatively close to a coefficient of thermal expansion of ceramics, which is the constituent material of the base section 22. Therefore, thermal stress (a bend due to a difference between the coefficients of thermal expansion of the base section 22 and the bottom member 23) less easily occurs in the base body 21. It is possible to effectively prevent output drift due to the thermal stress.

The lid body 24 is formed in a plate shape and is joined to the upper surface of the base section 22 via a seal member 20 to close an opening formed on the C-axis direction plus side of the recessed section 221. As shown in FIGS. 2, 3, and 4, the lid body 24 includes a center section 241, an outer edge section 242 surrounding the center section 241 and formed in a frame shape along an outer edge of the center section 241, and a connecting section 243 located between the center section 241 and the outer edge section 242 and connecting the center section 241 and the outer edge section 242. Such a lid body 24 is joined to the upper surface of the base section 22 via the seal member 20 at the outer edge section 242. The center section 241 is located to shift to the opposite side of the bottom member 23 (the C-axis direction plus side) with respect to the outer edge section 242. The connecting section 243 is inclined to connect the outer edge section 242 and the center section 241 and is formed in a taper shape.

By forming the lid body 24 in a hat shape in this way, the outer circumferential portion of the package 2 is reduced in height. Therefore, it is possible to achieve a reduction in the size of the package 2. Since boundary portions of the center section 241, the connecting section 243, and the outer edge section 242 bend, it is possible to reduce and absorb stress applied to the lid body 24. Therefore, it is possible to prevent peeling of the lid body 24. In particular, as shown in FIG. 5, the lid body 24 is joined to the upper surface of the base section 22 using seam welding. However, stress caused by pressing a roller electrode RE against the outer edge section 242 and thermal stress caused by heating the lid body 24 with the roller electrode RE can be effectively reduced and absorbed by the deformation explained above. Therefore, it is possible to effectively prevent breakage of the lid body 24 and more surely hermetically seal the housing space S. However, the shape of the lid body 24 is not particularly limited. For example, the lid body 24 may be formed in a flat shape. Contrary to this embodiment, the center section 241 may be recessed.

A constituent material of such a lid body 24 is not particularly limited. Like the constituent material of the bottom member 23 explained above, examples of the constituent material include various metal materials such as stainless steel, Kovar, copper, iron, carbon steel, and titanium. In particular, the constituent material is desirably Kovar. Consequently, like the bottom member 23, it is possible to accurately transmit an external force to the force detection element 3 and reduce breakage of the lid body 24 by the external force. The constituent material of the lid body 24 may be the same as or may be different from the constituent material of the bottom member 23. However, the constituent materials are desirably the same. Consequently, it is possible to more accurately transmit an external force applied to the package 2 to the force detection element 3.

The force detection element 3 has a function of outputting an electric charge Qa (a first electric charge serving as a first signal) corresponding to a component in the A-axis direction of an external force applied to the force detection element 3 and an electric charge Qb (a second electric charge serving as a second signal) corresponding to a component in the B-axis direction of the external force applied to the force detection element 3. The force detection element 3 includes, as shown in FIG. 6, a piezoelectric element 31 (a first piezoelectric element) configured to output the electric charge Qa according to an external force (a shearing force) in the A-axis direction, a piezoelectric element 32 (a second piezoelectric element) configured to output the electric charge Qb according to an external force (a shearing force) in the B-axis direction, and a pair of supporting substrates 33 and 34.

The piezoelectric element 31 has a configuration in which a ground electrode layer 311, a piezoelectric layer 312, an output electrode layer 313, a piezoelectric layer 314, a ground electrode layer 315, a piezoelectric layer 316, an output electrode layer 317, a piezoelectric layer 318, and a ground electrode layer 319 are stacked in order from the lower side (the C-axis direction minus side). The piezoelectric element 32 is stacked on the piezoelectric element 31. The piezoelectric element 32 has a configuration in which a ground electrode layer 321, a piezoelectric layer 322, an output electrode layer 323, a piezoelectric layer 324, a ground electrode layer 325, a piezoelectric layer 326, an output electrode layer 327, a piezoelectric layer 328, and a ground electrode layer 329 are stacked in order from the lower side (the C-axis direction minus side). In this embodiment, the ground electrode layers 319 and 321 are integrated (made common). However, the ground electrode layers 319 and 321 are not limited to this. The order of the stacking in the C-axis direction of the piezoelectric elements 31 and 32 may be opposite. The piezoelectric elements 31 and 32 may be not stacked and may be laterally arranged.

The piezoelectric layers 312, 314, 316, 318, 322, 324, 326, and 328 are respectively formed of quartz. Consequently, the force detection element 3 has excellent characteristics such as high sensitivity, a wide dynamic range, and high rigidity. In the piezoelectric layers 312 and 316, the X axis (an electric axis), which is a crystal axis of the quartz, faces the right side in FIG. 6 (the A-axis direction plus side). In the piezoelectric layers 314 and 318, the X axis of the quartz faces the left side in FIG. 6 (the A-axis direction minus side). In the piezoelectric layers 322 and 326, the X axis of the quartz faces the paper surface depth side in FIG. 6 (the B-axis direction plus side). In the piezoelectric layers 324 and 328, the X axis of the quartz faces the paper surface near side in FIG. 6 (the B-axis direction minus side). The piezoelectric layers 312, 314, 316, 318, 322, 324, 326, and 328 are respectively formed by Y-cut quartz plates (quartz plates having the Y axis (a machine axis) of the quartz as the thickness direction).

However, the piezoelectric layers 312, 314, 316, 318, 322, 324, 326, and 328 may be formed of a piezoelectric material other than the quartz. Examples of the piezoelectric material other than the quartz include topaz, barium titanate, lead titanate, titanate zirconate (PZT: Pb(Zr,Ti)O3), lithium niobate, and lithium tantalate.

The ground electrode layers 311, 315, 319 (321), 325, and 329 are respectively electrically connected to reference potential (e.g., ground potential GND). The output electrode layers 323 and 317 are respectively electrically connected to a first circuit 4A. The output electrode layers 323 and 327 are respectively electrically connected to a second circuit 4B. A constituent material of the ground electrode layers 311, 315, 319 (321) 325, and 329 and the output electrode layers 313, 317, 323, and 327 is not particularly limited. Examples of the constituent material include nickel, gold, titanium, aluminum, copper, iron, chrome, or an alloy containing these kinds of metal. One of these kinds of metal can be used or two or more of these kinds of metal can be used in combination (e.g., stacked and used).

The pair of supporting substrates 33 and 34 is disposed to vertically sandwich a stacked body of the piezoelectric elements 31 and 32. Specifically, the supporting substrate 33 is disposed on the upper surface of the stacked body of the piezoelectric elements 31 and 32 and the supporting substrate 34 is disposed on the lower surface of the stacked body. Consequently, the ground electrode layers 311 and 329 can be covered by the supporting substrates 33 and 34. The ground electrode layers 311 and 329 can be protected. It is possible to prevent the ground electrode layers 311 and 329 from coming into contact with the package 2 to cause unintended conduction.

The supporting substrates 33 and 34 are formed of quartz. The supporting substrate 33 has the same configuration as the configuration of the piezoelectric layer 328 adjacent thereto. That is, like the piezoelectric layer 328, the supporting substrate 33 is formed by a Y-cut quartz plate. The X axis of the quartz faces the paper surface near side in FIG. 6 (the B-axis direction minus side). Similarly, the supporting substrate 34 has the same configuration as the configuration of the piezoelectric layer 312 adjacent thereto. That is, like the piezoelectric body layer 312, the supporting substrate 34 is formed by a Y-cut quartz plate. The X axis of the quartz faces the right side in FIG. 6 (the A-axis direction plus side). In this way, the supporting substrate 33 is configured the same as the piezoelectric layer 328 adjacent thereto and the supporting substrate 34 is configured the same as the piezoelectric layer 312 adjacent thereto. Consequently coefficients of thermal expansion of these members can be obtained. It is possible to effectively reduce output drift due to thermal expansion.

A crystal axis of the supporting substrate 33 may not coincide with a crystal axis of the piezoelectric layer 328. A crystal axis of the supporting substrate 34 may not coincide with a crystal axis of the piezoelectric layer 312. The supporting substrates 33 and 34 may be respectively formed of a piezoelectric body other than the quartz or may be formed of a material not having conductivity other than the piezoelectric body. The supporting substrates 33 and 34 may be omitted.

As shown in FIG. 7, the overall shape of the force detection element 3 is a rectangular parallelepiped. That is, the force detection element 3 includes an upper surface 3a, which is the upper surface of the supporting substrate 33, a lower surface 3b, which is the lower surface of the supporting substrate 34, and four side surfaces 3c, 3d, 3e, and 3f that connect the upper surface 3a and the lower surface 3b. On the side surface 3c facing the B-axis direction minus side, a connection electrode 391 electrically connected to the ground electrode layers 311, 315, 319 (321), 325, and 329 and a connection electrode 392 electrically connected to the output electrode layers 323 and 327 are provided to be spaced apart in the width direction (the A-axis direction). In this embodiment, the connection electrode 391 is located on the A-axis direction minus side. The connection electrode 392 is located on the X-axis direction plus side.

On the side surface 3e opposed to the side surface 3c and facing the B-axis direction plus side, a connection electrode 393 electrically connected to the ground electrode layers 311, 315, 319 (321), 325, and 329 and a connection electrode 394 electrically connected to the output electrode layers 313 and 317 are provided to be separated in the width direction (the A-axis direction). In this embodiment, the connection electrode 394 is located on the A-axis direction minus side. The connection electrode 393 is located on the A-axis direction plus side.

By providing the connection electrodes 391, 392, 393, and 394 on the side surfaces 3c and 3e in this way, it is possible to easily perform electric connection of the force detection element 3 and the first and second circuits 4A and 4B.

However, the disposition of the connection electrodes 391, 392, 393, and 394 is not particularly limited. For example, the connection electrodes 391, 392, 393, and 394 may be separately disposed on different side surfaces of the force detection element 3 or may be collectively disposed on one side surface of the force detection element 3. The connection electrodes 391, 392, 393, and 394 may be disposed on the upper surface 3a and the lower surface 3b of the force detection element 3. The shape of the force detection element 3 is not particularly limited. For example, in the plan view, the shape of the force detection element 3 may be any shape such as a circle, an ellipse, a triangle, quadrangles other than a square (a rectangle, a trapezoid, a parallelogram, etc.), polygons other than a pentagon, and irregular shapes.

The force detection element 3 is explained above. As shown in FIGS. 2 and 3, the lower surface 3b of the force detection element 3 is joined to the bottom surface of the recessed section 224 of the package 2 (the upper surface of the bottom member 23) via an insulative adhesive 29. The adhesive 29 is not particularly limited. For example, acrylic resin, phenolic resin, silicone resin, and epoxy resin can be used.

As shown in FIGS. 2 and 3, in a natural state, the upper surface 3a of the force detection element 3 is disposed to be opposed to the center section 241 of the lid body 24 via an interval (a gap G). Consequently, it is possible to effectively prevent a situation in which, because the force detection element 3 is sandwiched by the bottom member 23 and the lid body 24, unintended stress (stress other than a detection target) is applied to the force detection element 3 and drift of an output occurs. However, not only this, but the upper surface 3a of the force detection element 3 may be in contact with the center section 241 of the lid body 24. An adhesive (e.g., the same adhesive as the adhesive 29) may be provided between the upper surface 3a of the force detection element 3 and the center section 241 of the lid body 24. The force detection element 3 and the lid body 24 may be joined via the adhesive.

The first circuit 4A and the second circuit 4B are respectively housed in the housing space S of the package 2. As shown in FIG. 8, in the plan view, the first circuit 4A is located on one side (the A-axis direction minus side) with respect to the force detection element 3 and the second circuit 4B is located on the other side (the A-axis direction plus side) with respect to the force detection element 3. The first circuit 4A is a circuit that processes the electric charge Qa output from the force detection element 3. The second circuit 4B is a circuit that processes the electric charge Qb output from the force detection element 3. By providing the first circuit 4A and the second circuit 4B on the opposite sides with respect to the force detection element 3 in this way, the first circuit 4A and the second circuit 4B can be disposed to be separated as much as possible. Therefore, interference between the first circuit 4A and the second circuit 4B is reduced. It is possible to effectively prevent noise from the second circuit 4B from being superimposed on the electric charge Qa and, conversely, noise from the first circuit 4A from being superimposed on the electric charge Qb. Therefore, noise resistance is improved. The electric charge Qa can be accurately processed by the first circuit 4A. The electric charge Qb can be accurately processed by the second circuit 4B.

The first circuit 4A is a circuit (a charge/voltage conversion circuit) that converts the electric charge Qa into a voltage Va. As shown in FIG. 9, the first circuit 4A includes a resistor 41A to which the electric charge Qa is input, a capacitor 43A (a charge accumulating section) configured to charge the electric charge Qa, an operational amplifier 42A (an amplifier) configured to amplify a voltage by the electric charge Qa, a switching element 44A, and the wire 46A.

Among the circuit elements, the resistor 41A and the capacitor 43A are respectively provided on the bottom surface of the recessed section 221. The operational amplifier 42A and the switching element 44A are integrated as the circuit element 45A and then provided on the bottom surface of the recessed section 225. The resistor 41A, the capacitor 43A, and the circuit element 45A are electrically connected via the wire 46A. The wire 46A is electrically connected to the connection electrodes 391 and 394 of the force detection element 3 via conductive connection members 261 and 264 (e.g., various kinds of metal paste such as Ag paste, Cu paste, and Au paste). Consequently, a circuit shown in FIG. 9 is realized.

In this embodiment, the resistor 41A and the capacitor 43A are electrically connected to the wire 46A by flip-chip mounting using a conductive bump such as a gold (Au) bump. The circuit element 45A is electrically connected to the wire 46A via a bonding wire BW. However, an electric connection method for connecting the resistor 41A, the capacitor 43A, and the circuit element 45A to the wire 46A is not particularly limited. The operational amplifier 42A and the switching element 44A may be formed as separate bodies.

The second circuit 4B is a circuit (a charge/voltage conversion circuit) that converts the electric charge Qb into a voltage Vb. The second circuit 4B has the same configuration as the configuration of the first circuit 4A explained above. That is, the second circuit 4B includes, as shown in FIG. 10, a resistor 41B to which the electric charge Qb is input, a capacitor 43B (a charge accumulating section) configured to charge the electric charge Qb, an operational amplifier 42B (an amplifier) configured to amplify a voltage by the electric charge Qb, a switching element 44B, and the wire 46B.

Among these circuit elements, the resistor 41B and the capacitor 43B are respectively provided on the bottom surface of the recessed section 221. The operational amplifier 42B and the switching element 44B are integrated as the circuit element 45B and then provided on the bottom surface of the recessed section 226. The resistor 41B, the capacitor 43B, and the circuit element 45B are electrically connected via the wire 46B. The wire 46B is electrically connected to the connection electrodes 392 and 393 of the force detection element 3 via conductive connection members 262 and 263 (e.g., various kinds of metal paste such as Ag paste, Cu paste, and Au paste). Consequently, a circuit shown in FIG. 10 is realized.

In this embodiment, the resistor 41B and the capacitor 43B are electrically connected to the wire 46B by flip-chip mounting using a conductive bump such as a gold (Au) bump. The circuit element 45B is electrically connected to the wire 46B via the bonding wire BW. However, an electric connection method for connecting the resistor 41B, the capacitor 43B and the circuit element 45B to the wire 46B is not particularly limited. The operational amplifier 42B and the switching element 44B may be formed as separate bodies.

In the first circuit 4A, the circuit element 45A is thicker than the other circuit elements, that is, the resistor 41A and the capacitor 43A. Therefore, in this embodiment, the recessed section 225 is formed on the bottom surface of the recessed section 221. The circuit element 45A is provided on the bottom surface of the recessed section 225. Consequently, the height of the circuit element 45A can be reduced. Therefore, it is possible to prevent an increase in the height of the package 2. It is easy to secure a disposition space of the boding wire BW on the circuit element 45A.

Similarly, in the second circuit 4B, the circuit element 45B is thicker than the other circuit components, that is, the resistor 41B and the capacitor 43B. Therefore, in this embodiment, the recessed section 226 is formed on the bottom surface of the recessed section 221. The circuit element 45B is provided on the bottom surface of the recessed section 226. Consequently the height of the circuit element 45B can be reduced. Therefore, it is possible to prevent an increase in the height of the package 2. It is easy to secure a disposition space of the bonding wire BW on the circuit element 45B. However, the recessed sections 225 and 226 may be omitted. The circuit elements 45A and 45B may be disposed on the bottom surface of the recessed section 221.

As shown in FIG. 4, in the first circuit 4A, in the plan view, all of the resistor 41A, the capacitor 43A, and the circuit element 45A are disposed to overlap the center section 241 of the lid body 24. As explained above, the center section 241 of the lid body 24 is offset further to the upper side than the other portions (the outer edge section 242). Therefore, it is possible to prevent contact of the resistor 41A, the capacitor 43A, and the circuit element 45A with the lid body 24. It is possible to reduce breakage and malfunction of the first circuit 4A.

Similarly, in the second circuit 4B, in plan view, all of the resistor 41B, the capacitor 43B, and the circuit element 45B are disposed to overlap the center section 241 of the lid body 24. Therefore, it is possible to effectively prevent contact of the resistor 41B, the capacitor 43B and the circuit element 45B with the lid body 24. It is possible to prevent breakage and malfunction of the second circuit 4B. However, not only this, but, for example, at least one of the resistors 41A and 41B, the capacitors 43A and 43B, and the circuit elements 45A and 45B may be disposed in a position not overlapping the center section 241 in the plan view.

By housing the first circuit 4A and the second circuit 4B in the package 2, the first and second circuits 4A and 4B can be protected and dustproof and waterproof can be improved. In particular, it is possible to effectively prevent deterioration in characteristics of the first and second circuits 4A and 4B by protecting the first and second circuits 4A and 4B from moisture (humidity). For example, the capacitors 43A and 43B are portions that charge the electric charges Qa and Qb from the power detection element 3. However, the capacitors 43A and 43B are easily affected by a leak current due to humidity. In the operational amplifiers 42A and 42B, an offset voltage on an input side fluctuates because of humidity. In this way, the first and second circuits 4A and 4B include the circuit elements easily affected by moisture (humidity). Therefore, it is possible to effectively prevent deterioration and fluctuation in circuit characteristics of the first and second circuits 4A and 4B by housing the first and second circuits 4A and 4B in the package 2 and waterproofing the first and second circuits 4A and 4B. It is possible to more accurately convert the electric charges Qa and Qb into voltages Va and Vb. Therefore, with the sensor device 1, it is possible to more accurately detect a received external force.

By housing the first and second circuits 4A and 4B in the package 2, it is possible to reduce the lengths of the wires 46A and 46B compared with, for example, when the first and second circuits 4A and 4B are disposed on the outer side of the package 2. Therefore, noise resistance of the first and second circuits 4A and 4B is improved.

The first and second circuits 4A and 4B are symmetrically disposed with respect to the force detection element 3 in the plan view. Specifically, the first circuit 4A and the second circuit 4B are disposed to be point-symmetrical (180° rotation-symmetrical) with respect to a center O of the force detection element 3. Consequently, it is possible to substantially equalize circuit characteristics (wiring lengths, influences from the periphery, etc.), that is, charge/voltage conversion characteristics of the first and second circuits 4A and 4B. Therefore, it is possible to extract a signal corresponding to an external force (a shearing force) in the A-axis direction and a signal corresponding to an external force (a shearing force) in the B-axis direction in a well-balanced state. It is possible to more accurately detect a received external force.

The center O may be a geometrical center in the plan view of the force detection element 3 in a broad sense or may be a geometrical center of the upper surface 3*a* in a narrow sense.

The first circuit 4A and the second circuit 4B being point-symmetrically disposed with respect to the center O means that at least the circuit elements (the resistors 41A and 41B, the capacitors 43A and 43B, and the circuit elements 45A and 45B) are point-symmetrically disposed with respect to the center O and preferably means that the wires 46A and 46B are also point-symmetrically disposed with respect to the center O. The first circuit 4A and the second circuit 4B being point-symmetrically disposed with respect to the center O means that, for example, errors that could occur in design or manufacturing are included. The point-symmetry is not always limited to perfect point symmetry. This also means that, in the plan view, besides a symmetrical point of the first circuit 4A and the second circuit 4B coinciding with the center O, the symmetrical point deviates from the center O in a range overlapping the force detection element 3 are included.

Since the first circuit 4A and the second circuit 4B are point-symmetrical with respect to the center O, accordingly, in the force detection element 3, the connection electrode 394 from which the electric charge Qa is output is disposed on the side surface 3*e* facing the B-axis direction plus side and the connection electrode 392 from which the electric charge Qb is output is disposed on the side surface 3*c* facing the B-axis direction minus side. Further, the connection member 264 that connects the first circuit 4A and the connection electrode 394 is disposed on the B-axis direction plus side with respect to the force detection element 3. The connection member 262 that connects the second circuit 4B and the connection electrode 392 is disposed on the B-axis direction minus side with respect to the force detection element 3. By adopting such disposition, with relatively simple disposition, it is possible to point-symmetrically dispose the first circuit 4A and the second circuit 4B with respect to the center O of the force detection element 3. In particular, in this embodiment, the connection electrode 394 is disposed to deviate to the first circuit 4A side (the A-axis direction minus side) of the side surface 3*e*. Therefore, the length of a wire connecting the connection electrode 394 and the resistor 41A can be reduced. Similarly, the connection electrode 392 is disposed to deviate to the second circuit 4B side (the A-axis direction plus side) of the side surface 3*c*. Therefore, the length of a wire connecting the connection electrode 392 and the resistor 41B can be reduced.

The sensor device 1 is explained above. Such a sensor device 1 includes, as explained above, the base body including the recessed section 221, the lid body 24 configured to close the opening of the recessed section 221 and seal the recessed section 221, the force detection element 3 including the piezoelectric element 31 (the first piezoelectric element) that outputs the electric charge Qa (the first electric charge serving as the first signal) according to an external force in the A-axis direction (the first direction) and the piezoelectric element 32 (the second piezoelectric element) that outputs the electric charge Qb (the second electric charge serving as the second signal) according to an externa force in the B-axis direction (the second direction different from the first direction), the first circuit 4A disposed in the recessed section 221 and configured to process the electric charge Qa, and the second circuit 4B disposed in the recessed section 221 and configured to process the electric charge Qb. In the plan view (the plan view of the base body 21), the first circuit 4A is located on one side of the force detection element 3 (the A-axis direction minus side) and the second circuit 4B is located on the other side (the A-axis direction plus side). By providing the first circuit 4A and the second circuit 4B on the opposite sides with respect to the force detection element 3 in this way, the first circuit 4A and the second circuit 4B can be disposed to be separated from each other as much as possible. Therefore, interference between the first circuit 4A and the second circuit 4B is reduced. It is possible to effectively prevent noise from the second circuit 4B from being superimposed on the electric charge Qa and, conversely, noise from the first circuit 4A from being superimposed on the electric charge Qb. Therefore, the electric charge Qa can be accurately processed by the first circuit 4A. The electric charge Qb can be accurately processed by the second circuit 4B. As a result, the sensor device 1 can accurately detect a received external force.

As explained above, the piezoelectric element 31 and the piezoelectric element 32 may be respectively independently disposed as the first element and the second element. In that case, the first circuit 4A is disposed on one side of the first element and one side of the second element, which is the same side as the one side of the first element. The second circuit 4B is disposed on the other side of the first element and the other side of the second element, which is the same side as the other side of the first element. One side of the force detection element 3 may be set as the A-axis direction minus side and the other side may be set as the A-axis direction plus side. Besides, when an axis inclined a predetermined angle with respect to the A axis in the plan view is set as a boundary, one side of the boundary may be set as one side of the force detection element 3 and the other side of the boundary may be set as the other side of the force detection element 3.

Further, as shown in FIG. 5 of Patent Literature 1, in the configuration in which the plurality of piezoelectric elements for multi-axis detection are disposed on the substrate and the signal processing circuits for the piezoelectric elements are disposed on another substrate serving as a second story built on the substrate on which the piezoelectric elements are disposed, the signal processing circuits of the plurality of piezoelectric elements are disposed on the other substrate serving as the second story. The signal processing circuits of the piezoelectric elements of a plurality of axes are disposed close to one another. It is more likely that signals of the axes output from the laminated piezoelectric element interfere with one another to be noise. On the other hand, in the sensor device according to the first embodiment of the invention, the signal processing circuits (the first circuit 4A and the second circuit 4B according to the invention) are not close to each other. The signals of the axes output from the piezoelectric elements less likely to interfere to be noise. It is possible to accurately detect a received external force.

The first circuit 4A being located on one side of the force detection element 3 and the second circuit 4B being located on the other side means that at least the circuit elements (the resistor 41A, the capacitor 43A, and the circuit element 45A) included in the first circuit 4A is located on one side (further on the A-axis direction minus side than an imaginary line segment L1 in FIG. 8) of the force detection element 3 and the circuit elements (the resistor 41B, the capacitor 43B, and the circuit element 45B) included in the second circuit 4B are located on the other side (further on the A-axis direction plus side than an imaginary line segment L2 in FIG. 8) of the force detection element 3. Therefore, for example, a part of the wire 46A may be located further on the A-axis direction plus side than the imaginary line segment L1. A part of the wire 46B may be located further on the A-axis direction minus side than the imaginary line segment L2. Both of the imaginary line segments L1 and L2 may be line segments passing the center O of the force detection element 3.

As explained above, in the plan view, the first circuit 4A and the second circuit 4B are symmetrically disposed with respect to the force detection element 3. Consequently, it is possible to substantially equalize circuit characteristics (in this embodiment, charge/voltage conversion characteristics) of the first and second circuit 4A and 4B each other. Therefore, the sensor device 1 can extract a signal corresponding to an external force (a shearing force) in the A-axis direction and a signal corresponding to an external force (a shearing force) in the B-axis direction in a well-balanced state and can more accurately detect a received external force.

As explained above, the sensor device 1 includes the connection member 264 (the first connection member) configured to electrically connect the wire 46A of the first circuit 4A and the piezoelectric element 31 and the connection member 262 (the second connection member) configured to electrically connect the wire 46B of the second circuit 4B and the piezoelectric element 32. In the plan view of the base body 21, when the direction in which the first circuit 4A and the second circuit 4B are arranged is represented as the A-axis direction (the first direction) and the direction orthogonal to the A-axis direction is represented as the B-axis direction (the second direction), the connection member 264 and the connection member 262 are arranged side by side in the B-axis direction. Consequently, for example, compared with when the connection members 262 and 264 are respectively arranged side by side with the force detection element 3 in the A-axis direction as in a third embodiment explained below, it is possible to reduce the length in the major axis direction (the A-axis direction) of the package 2. Therefore, a plan view shape of the package 2 can be formed in a shape similar to a square (desirably formed in a square shape). As a result, the package 2 can more uniformly receive an external force in the A-axis direction and an external force in the B-axis direction. More specifically, it is possible to substantially equalize transmission of the external force in the A-axis direction to the force detection element 3 and transmission of the external force in the B-axis direction to the force detection element 3. It is possible to more accurately detect the two external forces.

As explained above, in the plan view of the base body 21, the first circuit 4A and the second circuit 4B are disposed in the positions point-symmetrical (180° rotation-symmetrical) with respect to the center of the force detection element 3. The connection member 264 is located on one side (the plus side) of a side extending in the B-axis direction of the force detection element 3 and the connection member 262 is disposed the other side (the minus side) of the side extending in the B-axis direction of the force detection element 3. That is, the connection member 264 is located on one side (the plus side) in the B-axis direction with respect to the force detection element 3 and the connection member 262 is located on the other side (the minus side) in the B-axis direction with respect to the force detection element 3. By disposing the connection members 262 and 264 on the opposite sides with respect to the force detection element 3 in this way, it is easy to dispose the first circuit 4A and the second circuit 4B in the positions point-symmetrical with respect to the force detection element 3.

As explained above, the first piezoelectric element 31 (the first element) outputs the electric charge Qa (the first electric charge) serving as the first signal. The second piezoelectric element 32 (the second element) outputs the electric charge Qb (the second electric charge) serving as the second signal. The first circuit 4A is a circuit that converts the electric charge Qa into the voltage Va. The second circuit 4B is a circuit that converts the electric charge Qb into the voltage Vb. Consequently, the sensor device 1 can easily detect a received external force.

As explained above, the first circuit 4A includes at least one of the resistor 41A to which the electric charge Qa is input, the capacitor 43A (the charge accumulating section) configured to accumulate the electric charge Qa, and the operational amplifier 42A (the amplifier) configured to amplify a voltage by the electric charge Qa. The second circuit 4B includes at least one of the resistor 41B to which the electric charge Qb is input, the capacitor 43B (the charge accumulating section) configured to accumulate the electric charge Qb, and the operational amplifier 42B (the amplifier) configured to amplify a voltage by the electric charge Qb. Therefore, these circuit elements are protected from moisture (humidity). The sensor device 1 can prevent deterioration and fluctuation in the circuit characteristics of the first circuit 4A and the second circuit 4B due to humidity and accurately detect a received external force. In particular, in this embodiment, the first circuit 4A includes all of the resistor 41A, the capacitor 43A, and the operational amplifier 42A. The second circuit 4B includes all of the resistor 41B, the capacitor 43B, and the operational amplifier 43B. Therefore, the effects explained above can be more conspicuously exerted. Not only this, but one or two of the resistor 41A, the capacitor 43A, and the operational amplifier 42A may be omitted from the first circuit 4A or one or two of the resistor 41B, the capacitor 43B, and the operational amplifier 42B may be omitted from the second circuit 4B.

As explained above, the piezoelectric element 31 and the piezoelectric element 32 respectively include the quartz. Consequently, the configuration of the piezoelectric elements 31 and 32 is simplified. The force detection element 3 has excellent characteristics such as high sensitivity, a wide dynamic range, and high rigidity.

Second Embodiment

A sensor device according to a second embodiment of the invention is explained.

Figure 11:
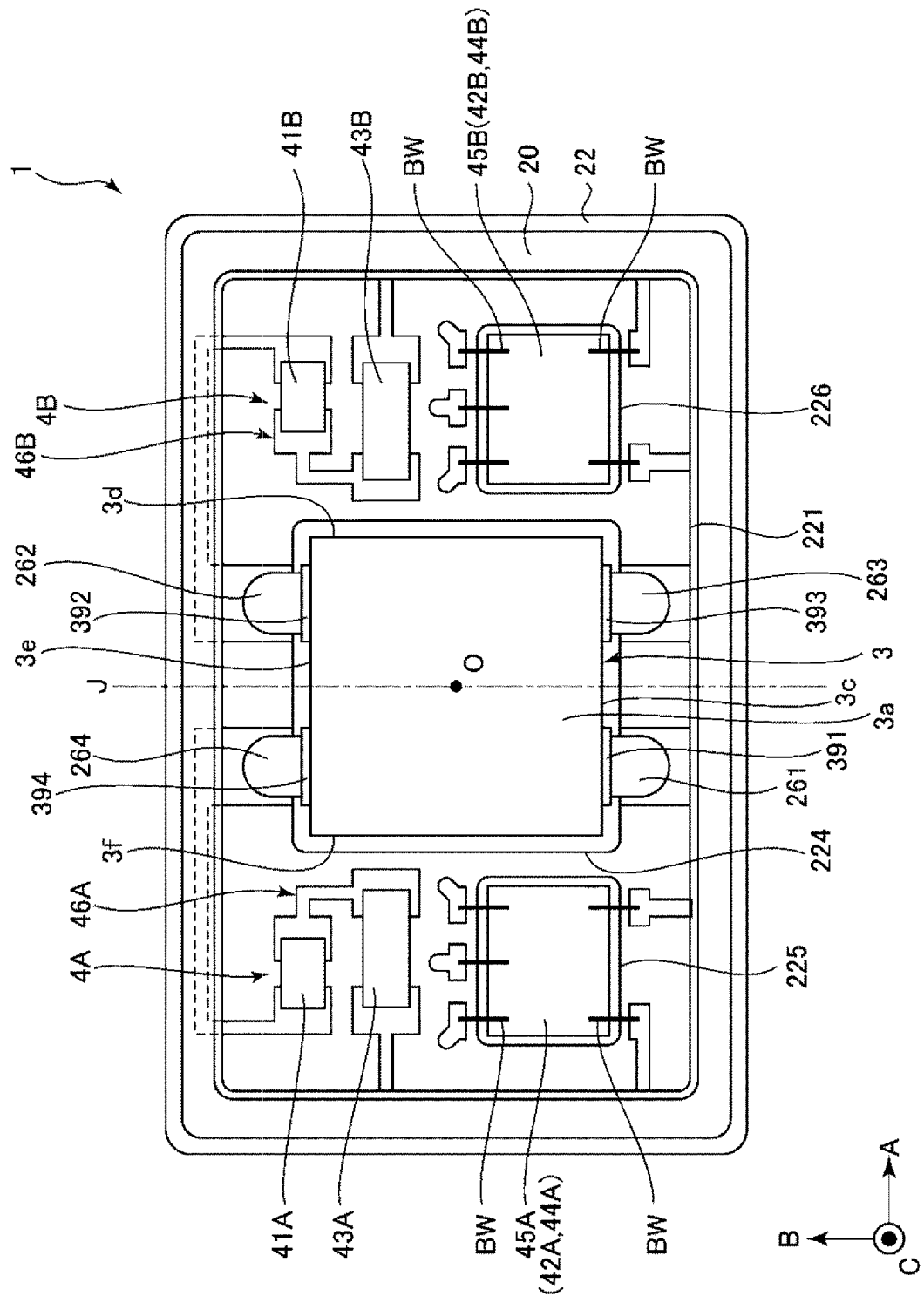
FIG. 11 is a plan view of a sensor device according to a second embodiment of the invention.

FIG. 11 is a plan view of the sensor device according to the second embodiment of the invention.

The sensor device 1 according to this embodiment is the same as the sensor device 1 in the first embodiment mainly except that disposition of the first circuit 4A and the second circuit 4B is different. In the following explanation, concerning the sensor device 1 in the second embodiment, differences from the first embodiment are mainly explained. Explanation of similarities to the first embodiment is omitted. In FIG. 11, the same components as the components in the first embodiment are denoted by the same reference numerals and signs.

As shown in FIG. 11, in this embodiment, the first and second circuits 4A and 4B are symmetrically disposed with respect to the force detection element 3 in the plan view. Specifically, the first circuit 4A and the second circuit 4B are disposed to be symmetrical with respect to an axis J crossing the center O of the force detection element 3 and extending in the B-axis direction in the plan view. Consequently, as in the first embodiment, it is possible to substantially equalize circuit characteristics (wiring lengths, influences from the periphery, etc.), that is, charge/voltage conversion characteristics of the first and second circuits 4A and 4B each other. Therefore, the sensor device 1 can extract a signal corresponding to an external force (a shearing force) in the A-axis direction and a signal corresponding to an external force (a shearing force) in the B-axis direction in a well-balanced state and can more accurately detect a received external force.

The first circuit 4A and the second circuit 4B being symmetrical disposed with respect to the axis J means that at least the circuit elements (the resistors 41A and 41B, the capacitors 43A and 43B, and the circuit elements 45A and 45B) are symmetrically disposed with respect to the axis J and preferably means that the wires 46A and 46B are further symmetrically disposed with respect to the axis J. The first circuit 4A and the second circuit 4B being symmetrically disposed with respect to the axis J means that, for example, errors that could occur in design or manufacturing are included. The symmetry is not always limited to perfect symmetry. This also means that, in the plan view, besides the axis J, which is the symmetry line of the first circuit 4A and the second circuit 4B, coinciding with the center O, the axis J deviates from the center O in a range overlapping the force detection element 3 are included.

Since the first circuit 4A and the second circuit 4B are symmetrical with respect to the axis J, accordingly, in the force detection element 3, the connection electrode 394 from which the electric charge Qa is output and the connection electrode 392 from which the electric charge Qb is output are disposed on the side surface 3e facing the B-axis direction plus side and the connection electrodes 391 and 393 are disposed on the side surface 3c facing the B-axis direction minus side. Further, the connection member 264 that connects the first circuit 4A and the connection electrode 394 and the connection member 262 that connects the second circuit 4B and the connection electrode 392 are disposed on the B-axis direction plus side with respect to the force detection element 3. By adopting such disposition, with relatively simple disposition, it is possible to symmetrically dispose the first circuit 4A and the second circuit 4B with respect to the axis J.

The sensor device 1 in this embodiment is explained above. In such a sensor device 1, as explained above, in the plan view of the base body 21, the first circuit 4A and the second circuit 4B are disposed in the positions symmetrical with respect to the straight line passing the center of the force detection element 3. The connection member 264 and the connection member 262 are located on the same side (in this embodiment, the plus side) in the B-axis direction with respect to the force detection element 3. By disposing the connection members 262 and 264 on the same side in the B-axis direction with respect to the force detection element 3, it is easy to symmetrically dispose the first circuit 4A and the second circuit 4B with respect to the force detection element 3. The force detection element 3 may have opposed two sides in the B-axis directions. The connection members 262 and 264 may be disposed on the same side of the opposed two sides in the B-axis direction.

According to the second embodiment explained above, it is possible to exert the same effects as the effects in the first embodiment.

Third Embodiment

A sensor device according to a third embodiment of the invention is explained.

Figure 12:
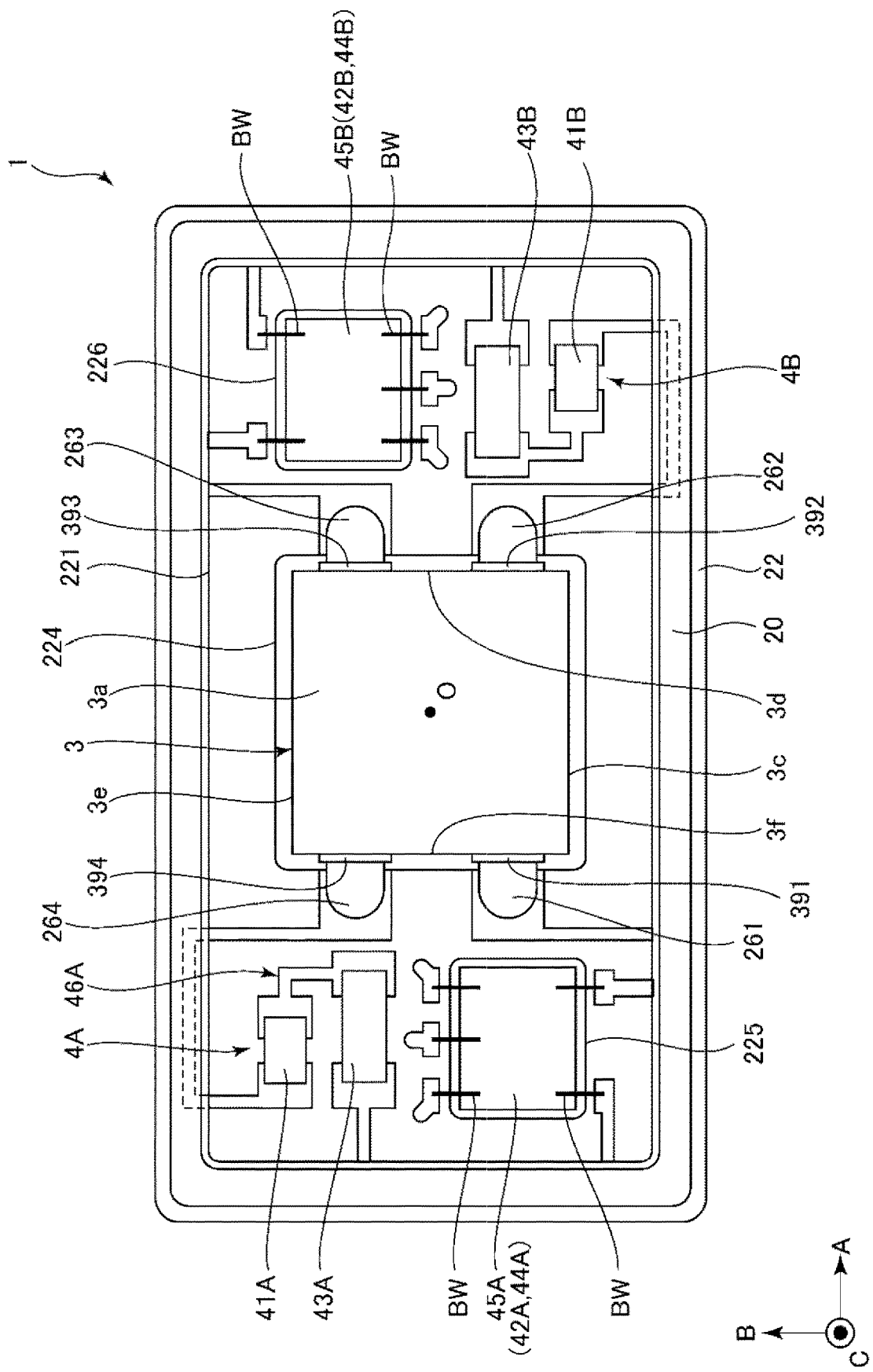
FIG. 12 is a plan view of a sensor device according to a third embodiment of the invention.

FIG. 12 is a plan view of the sensor device according to the third embodiment of the invention.

The sensor device 1 according to this embodiment is the same as the sensor device 1 in the first embodiment except that the configuration of the force detection element 3 is different. In the following explanation, concerning the sensor device 1 in the third embodiment, differences from the first embodiment are mainly explained. Explanation of similarities to the first embodiment is omitted. In FIG. 12, the same components as the components in the first embodiment are denoted by the same reference numerals and signs.

As shown in FIG. 12, in the force detection element 3 of the sensor device 1 in this embodiment, the connection electrodes 391 and 394 are provided on the side surface 3f facing the A-axis direction minus side and the connection electrodes 392 and 393 are provided on the side surface 3d facing the A-axis direction plus side. The connection members 261 and 264 are disposed to be located between the force detection element 3 and the first circuit 4A on the A-axis direction minus side with respect to the force detection element 3. The connection members 262 and 263 are disposed to be located between the force detection element 3 and the second circuit 4B on the A-axis direction plus side with respect to the force detection element 3. In such a configuration, as in the first embodiment, the first circuit 4A and the second circuit 4B are point-symmetrical with respect to the center O.

With the third embodiment explained above, the same effects as the effects in the first embodiment can be exerted.

Fourth Embodiment

A force detecting device according to a fourth embodiment of the invention is explained.

Figure 13:
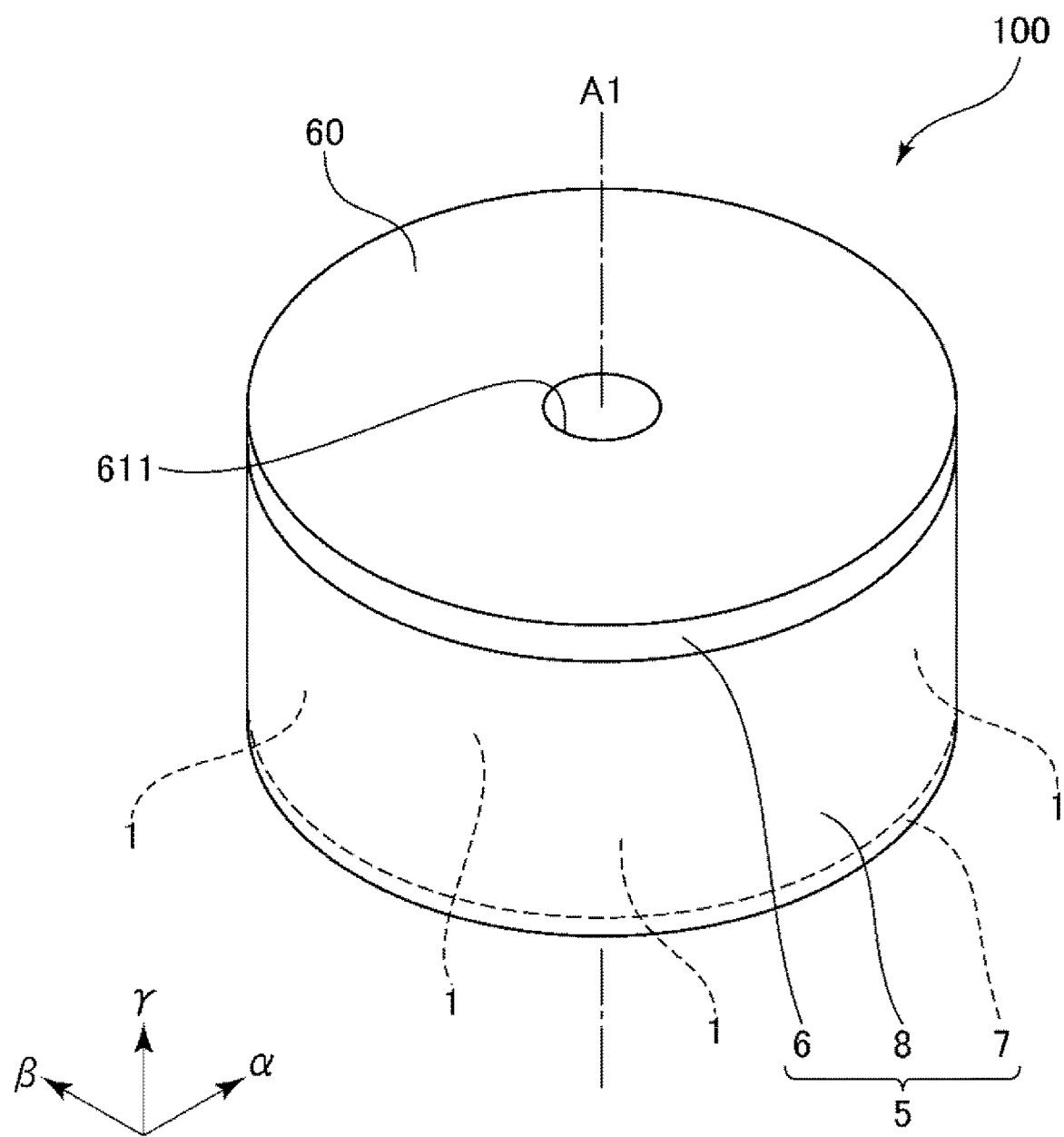
FIG. 13 is a perspective view of a force detecting device according to a fourth embodiment of the invention.
Figure 14:
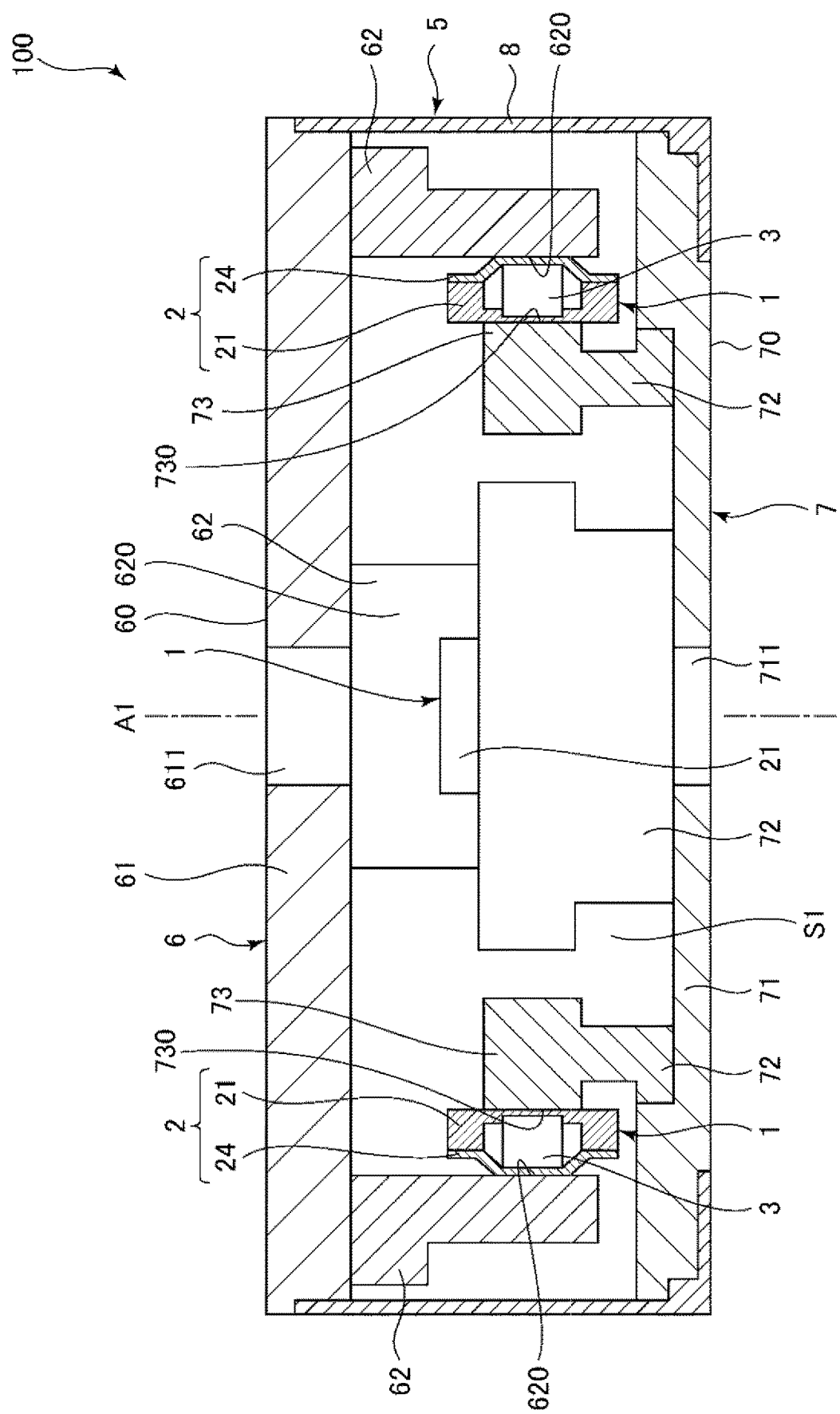
FIG. 14 is a longitudinal sectional view of the force detecting device shown in FIG. 13.
Figure 15:
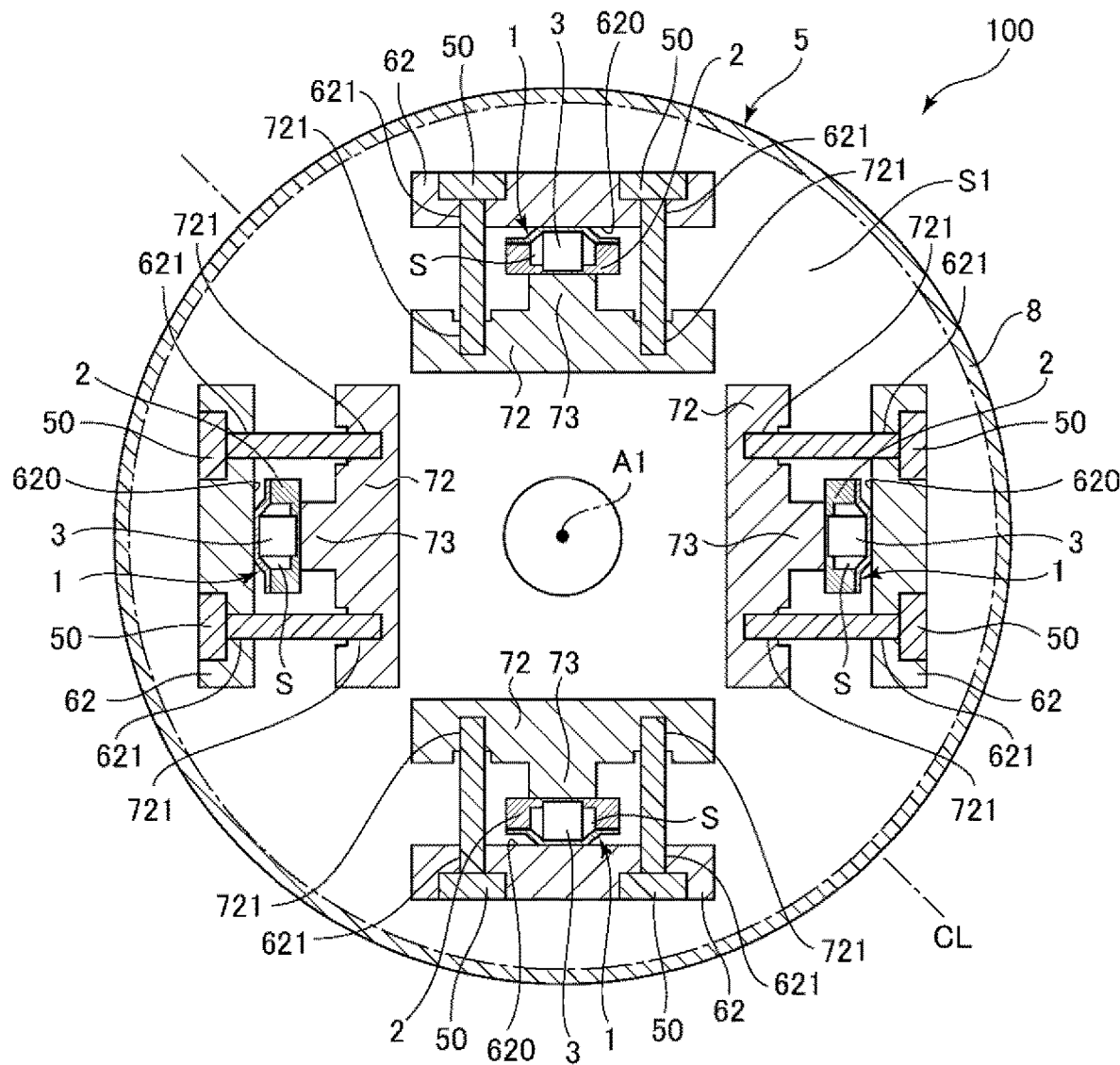
FIG. 15 is a cross sectional view of the force detecting device shown in FIG. 13.

FIG. 13 is a perspective view of the force detecting device according the fourth embodiment of the invention. FIG. 14 is a longitudinal sectional view of the force detecting device shown in FIG. 13. FIG. 15 is a cross sectional view of the force detecting device shown in FIG. 13. FIG. 16 is a sectional view of a sensor device disposed in the force detecting device.

In the following explanation, for convenience of explanation, three axes orthogonal to one another are represented as an $\alpha$ axis, a $\beta$ axis, and a $\gamma$ axis. The distal end sides of arrows indicating the axes are represented as a "plus side" and the proximal end sides of the arrows are represented as a "minus side". A direction parallel to the $\alpha$ axis is referred to as "$\alpha$-axis direction", a direction parallel to the $\beta$ axis is referred to as "$\beta$-axis direction", and a direction parallel to the $\gamma$ axis is referred to as "$\gamma$-axis direction". A $\gamma$-axis direction plus side is referred to as "upper" as well and a $\gamma$-axis direction minus side is referred to as "lower" as well. A view from the $\gamma$-axis direction is referred to as "plan view" as well.

A force detecting device 100 shown in FIG. 13 is a six-axis force sensor capable of detecting six-axis components of an external force applied to the force detecting device 100. The six-axis components include translational force (shearing force) components in respective directions of the three axes (in FIG. 13, the $\alpha$ axis, the $\beta$ axis, and the $\gamma$ axis) orthogonal to one another and rotational force (moment) components around the respective three axes.

The force detecting device 100 includes a plurality of (in this embodiment, four) sensor devices 1 disposed at equal intervals (90° intervals) around a center axis A1 of the force detecting device 100 (the $\gamma$ axis) and a case 5 that houses the sensor devices 1. The force detecting device 100 outputs detection signals corresponding to an external force received by the sensor devices 1 and processes the detection signals. Consequently, the force detecting device 100 can detect six-axis components of the external force applied to the force detecting device 100. Sections included in the force detecting device 100 are explained below.

Case

As shown in FIG. 13, the case 5 includes first case member 6, a second case member 7 disposed to be spaced apart from the first case member 6, and a sidewall section provided in the outer circumferential portions of the first case member 6 and the second case member 7.

As shown in FIG. 14, the first case member 6 includes a top plate 61 (a first base section) and four wall sections 62 (a first pressurizing section) provided on the lower surface of the top plate 61 and disposed at equal intervals (90° intervals) around the center axis A1. A through-hole 611 extending along the center axis A1 is formed in the center of the top plate 61. As shown in FIG. 15, in the wall sections 62, a plurality of through-holes 621, through which pressurizing bolts 50 explained below are inserted, are formed in the wall sections 62. Inner wall surfaces 620 (surfaces on the inner side) of the wall sections 62 are planes perpendicular to the top plate 61.

As shown in FIG. 14, the second case member 7 includes a bottom plate 71 (a second base section) and four wall sections 72 (a second pressurizing section) provided on the upper surface of the bottom plate 71 and disposed at equal intervals (90° intervals) around the center axis A1 to be opposed to the four wall sections 62. In the bottom plate 71, a through-hole 711 extending along the center axis A1 is formed in the center of the bottom plate 71. The wall sections 72 include projecting sections 73 projecting toward the wall sections 62 side opposed to the wall sections 72. Top surfaces 730 of the projecting sections 73 are parallel to the inner wall surfaces 620 and face the inner wall surfaces 620 at a predetermined distance (a distance for enabling insertion of the sensor device 1) apart from the inner wall surfaces 620. As shown in FIG. 15, a plurality of female screw holes 721, in which the distal end portions of the pressurizing bolts 50 are screwed, are formed in the wall sections 72.

The sidewall section 8 is formed in a cylindrical shape. The upper end portion and the lower end portion of the sidewall section 8 are respectively fixed to the first case member 6 and the second case member 7 by, for example, screwing or fitting. The four sensor devices 1 are housed in a space S1 (an internal space of the force detecting device 100) surrounded by the sidewall section 8 and the top plate 61 of the first case member 6 and the bottom plate 71 of the second case member 7 explained above.

In the case 5 explained above, an upper surface 60 of the first case member 6 functions as, for example, an attachment surface attached to an end effector 1700 (a member to be attached) included in a robot 1000 explained below. A lower surface 70 of the second case member 7 functions as, for example, an arm attachment surface attached to an arm 1200 included in the robot 1000.

The external shape in the plan view of the case 5 is a circle. However, the external shape is not limited to the circle and may be any shape such as a triangle, a square, a polygon such as a pentagon, an ellipse, and irregular shapes. In this embodiment, the wall sections 62 are formed by a member separate from the top plate 61 and fixed to the top plate 61. However, the wall sections 62 are not limited to this and may be formed integral with the top plate 61. Similarly, in this embodiment, the wall sections 72 are formed by members separate from the bottom plate 71 and fixed to the bottom plate 71. However, the wall sections 72 are not limited to this and may be formed integrally with the bottom plate 71.

Constituent materials of the first case member 6, the second case member 7, and the sidewall section 8 are respectively not particularly limited. For example, metal materials such as aluminum and stainless steel and ceramics can be used. The constituent materials of the first case member 6, the second case member 7, and the sidewall section 8 may be the same or may be different.

As shown in FIG. 15, the four sensor devices 1 are disposed to be symmetrical with respect to a line segment CL passing the center axis A1 and parallel to the β axis in the plan view. As shown in FIG. 14, the sensor devices 1 are located between the top plate 61 and the bottom plate 71. The sensor devices 1 are located between the wall sections 62 and the wall sections 72 (the projecting sections 73) and sandwiched by the wall sections 62 and the wall sections 72 (the projecting sections 73). Specifically, as shown in FIG. 16, the sensor devices 1 are disposed between the wall sections 62 and 72 in a state in which the base body 21 of the package 2 is directed to the wall sections 72 side and the lid body 24 is directed to the wall sections 62 side. Further, the bottom member 23 of the base body 21 is in contact with the top surfaces 730 of the projecting sections 73. The center section 241 of the lid body 24 is in contact with the inner wall surfaces 620 of the wall sections 62.

As shown in FIG. 15, the pressurizing bolts 50 couple the wall sections 62 and the wall sections 72. Consequently, the first case member 6 and the second case member 7 are fixed. The pressurizing bolts 50 are tightened, whereby the sensor devices 1 (the force detection elements 3) located between the wall sections 62 and the wall sections 72 are pressurized. That is, in the natural state, a compression force in a direction indicated by an arrow P in FIG. 16 is applied to the force detection element 3 in the natural state. By preloading the force detection element 3 in this way in the natural state, it is possible to accurately detect six-axis components of an external force applied to the force detecting device 100. The preload applied to the force detection element 3 can be adjusted by adjusting a fastening force of the pressurizing bolts 50 as appropriate.

A pair of pressurizing bolts 50 is provided for each sensor device 1. The pair of pressurizing bolts 50 is located on both sides of the sensor device 1. However, disposition of the pressurizing bolts 50 is not particularly limited. The pressurizing bolts 50 only have to be provided according to necessity. When unnecessary, the pressurizing bolts 50 may be omitted.

Such a force detecting device 100 includes a not-shown external force detection circuit. The external force detection circuit can detect (calculate), on the basis of voltages Va and Vb output from the sensor devices 1, a translational force component Fα in the α-axis direction, a translational force component Fβ in the β-axis direction, a translational force component Fγ in the γ-axis direction, a rotational force component Mα around the α axis, a rotational force component Mβ around the β axis, and a rotational force component Mγ around the γ axis. The external force detection circuit can include, for example, an AD converter and an arithmetic circuit such as a CPU connected to the AD converter.

The force detecting device 100 is explained above. As explained above, such a force detecting device 100 includes the top plate 61 (the first substrate), the bottom plate 71 (the second substrate), and the sensor device 1 (the sensor device according to the invention) provided between the top plate 61 and the bottom plate 71. With such a force detecting device 100, since the force detecting device 100 includes the sensor device 1, it is possible to more highly accurately detect an external force.

Fifth Embodiment

A robot according to a fifth embodiment of the invention is explained.

Figure 17:
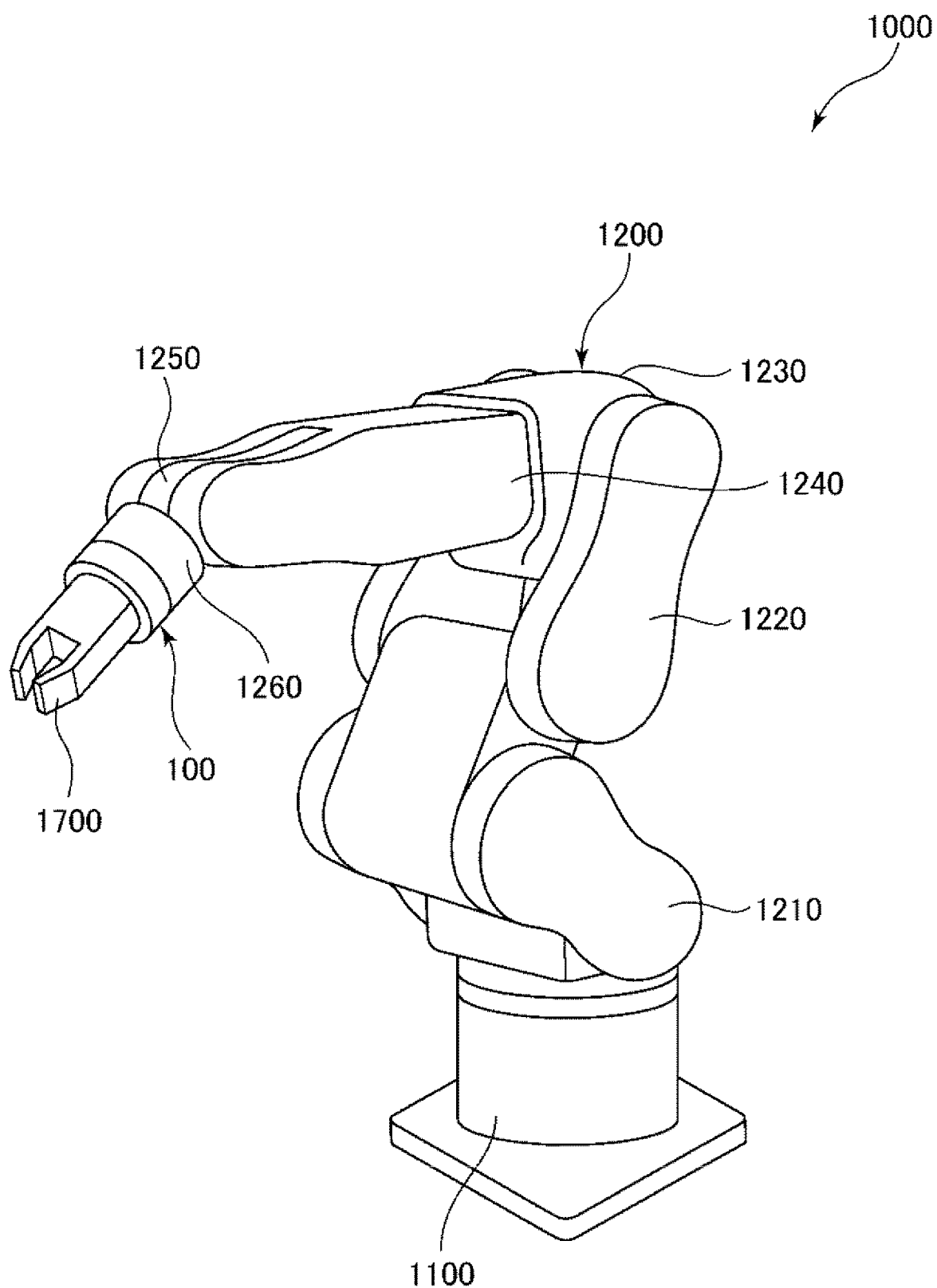
FIG. 17 is a perspective view of a robot according to a fifth embodiment of the invention.

FIG. 17 is a perspective view of the robot according to the fifth embodiment of the invention.

The robot 1000 shown in FIG. 17 can perform work such as supply, removal, conveyance, and assembly of target objects such as a precision instrument and components configuring the precision instrument. The robot 1000 is a single-arm robot and is, a so-called six-axis vertically articulated robot. The robot 1000 includes a base 1100, a robot arm 1200 turnably coupled to the base 1100, the force detecting device 100, and an end effector 1700.

The base 1100 is a portion fixed to, for example, a floor, a wall, a ceiling, and a movable truck. The robot arm 1200 includes an arm 1210 (a first arm), an arm 1220 (a second arm), an arm 1230 (a third arm), an arm 1240 (a fourth arm), an arm 1250 (a fifth arm), and an arm 1260 (a sixth arm). The arms 1210 to 1260 are coupled in this order from the proximal end side to the distal end side of the robot arm 1200. The arms 1210 to 1260 are turnable with resect to arms adjacent to one another or the base 1100.

The force detecting device 100 is connected to the distal end of the arm 1260. The force detecting device 100 detects a force (including a moment) applied to the end effector 1700 attached to the distal end of the force detecting device 100. The end effector 1700 is an instrument for performing work on a target object, which is a work target of the robot 1000. The end effector 1700 is configured by a hand having a function of gripping the target object. As the end effector 1700, an instrument corresponding to work content or the like of the robot 1000 only has to be used. The end effector 1700 is not limited to the hand. The end effector 1700 may be, for example, a screw tightening instrument for performing screw tightening or a fitting instrument for performing fitting.

Although not shown in FIG. 17, the robot 1000 includes a driving section including a motor that turns one arm with respect to the other arm (or the base 1100). Although not shown in FIG. 17, the robot 1000 includes an angle sensor that detects a rotation angle of a rotating shaft of a motor.

The robot 1000 is explained above. As explained above, such a robot 1000 includes the base 1100, the robot arm 1200 (the arm) connected to the base 1100, and the force detecting device 100 (the force detecting device according to the invention). With such a robot 1000, since the robot 1000 includes the force detecting device 100, it is possible to more precisely execute work by feeding back an external force detected by the force detecting device 100 to a control section (not shown in FIG. 17) having a function of controlling the robot 1000. The robot 1000 can detect, for example, contact with an obstacle of the end effector 1700 according to the external force detected by the force detecting device 100. Therefore, it is possible to easily perform an obstacle avoiding operation, a target object damage avoiding operation, and the like. The robot 1000 can more safely execute work.

The force detecting device 100 may be provided between arms adjacent to each other (e.g., between the arms 1240 and 1250). The robot 1000 may be other robots such as a SCARA robot and a double-arm robot. The number of arms of the robot 1000 is six in this embodiment. However, the number of arms is not limited to this and may be one to five or seven or more.

The sensor device, the force detection device and the robot of the invention are explained above with reference to the drawings of the embodiments. However, the invention is not limited to the embodiment. The components of the sections can be replaced with any components having the same functions. Any other components may be added to the invention. The sensor device and the force detecting device according to the invention can be incorporated in apparatuses other than the robot and may be mounted on a mobile body such as an automobile.

The entire disclosure of Japanese Patent Application No. 2018-035892, filed Feb. 28, 2018, is expressly incorporated by reference herein.

What is claimed is:

1. A sensor device comprising:
   a base body including a recess, the base body having a surface extending along first and second directions orthogonal to each other in a plan view, the recess having a first area, a second area, and a third area that are arranged along the first direction, the second area being sandwiched between the first area and the third area in the plan view;
   a lid body configured to cover the base body to create an inner space having the recess;
   a force detection element disposed in the second area of the recess, the force detection element including:
      a first element that outputs a first signal according to a first factor of an external force applied to the force detection element in a first axis; and
      a second element that is stacked on the first element and outputs a second signal according to a second factor of the external force in a second axis different from the first axis;
   a first circuit disposed in the first area of the recess, the first circuit being configured to process the first signal; and
   a second circuit disposed in the third area of the recess, the second circuit being configured to process the second signal,
   wherein the force detection element is sandwiched between the first circuit and the second circuit along the first direction in the plan view, and
   all imaginary straight lines on a plane along the first and second directions, extending directly from the first circuit to the second circuit, intersect the force detection element in the plan view.

2. The sensor device according to claim 1, further comprising:
   a first metal paste configured to electrically connect a wire of the first circuit and the first element; and
   a second metal paste configured to electrically connect a wire of the second circuit and the second element, wherein
   the first metal paste and the second metal paste are arranged along the second direction.

3. The sensor device according to claim 1, further comprising:
   a first metal paste configured to electrically connect a wire of the first circuit and the first element; and
   a second metal paste configured to electrically connect a wire of the second circuit and the second element, wherein
   the first element is a first piezoelectric element, the second element is a second piezoelectric element, in the plan view of the base body, the first circuit and the second circuit are disposed in positions symmetrical with respect to a straight line passing a center of the force detection element and parallel to the second direction, and in the plan view of the base body, the first metal paste and the second metal paste are located on a first side parallel to the first direction of the force detection element.

4. The sensor device according to claim 1, further comprising:

a first metal paste configured to electrically connect a wire of the first circuit and the first element; and a second metal paste configured to electrically connect a wire of the second circuit and the second element, wherein the first element is a first piezoelectric element, the second element is a second piezoelectric element, in the plan view of the base body, the first circuit and the second circuit are disposed in positions point-symmetrical with respect to a center of the force detection element, in the plan view of the base body, the first metal paste is located on a first side parallel to the first direction of the force detection element, and in the plan view of the base body, the second metal paste is located on a second side opposite to the first side and parallel to the first direction of the force detection element.

5. The sensor device according to claim 3, wherein the first element outputs a first electric charge as the first signal, the second element outputs a second electric charge as the second signal, the first circuit converts the first electric charge into a voltage, and the second circuit converts the second electric charge into a voltage.

6. The sensor device according to claim 5, wherein the first circuit includes at least one of a first resistor to which the first electric charge is input, a first capacitor configured to accumulate the first electric charge, or a first amplifier configured to amplify a voltage by the first electric charge, and the second circuit includes at least one of a second resistor to which the second electric charge is input, a second capacitor configured to accumulate the second electric charge, or a second amplifier that amplifies a voltage by the second electric charge.

7. The sensor device according to claim 3, wherein the first piezoelectric element and the second piezoelectric element respectively include quartz.

8. A force detecting device comprising:

a first substrate;

a second substrate;

a sensor device sandwiched by the first substrate and the second substrate; and a bolt that fastens the first substrate and the second substrate, wherein the sensor device includes:

a base body including a recess, the base body having a surface extending along first and second directions orthogonal to each other in a plan view, the recess having a first area, a second area, and a third area that are arranged along the first direction, the second area being sandwiched between the first area and the third area in the plan view;

a lid body configured to cover the base body to create an inner space having the recess;

a force detection element disposed in the second area of the recess, the force detection element including:

a first element that outputs a first signal according to a first factor of an external force applied to the force detection element in a first axis; and a second element that is stacked on the first element and outputs a second signal according to a second factor of the external force in a second axis different from the first axis;

a first circuit disposed in the first area of the recess, the first circuit being configured to process the first signal; and a second circuit disposed in the third area of the recess, the second circuit being configured to process the second signal, wherein the force detection element is sandwiched between the first circuit and the second circuit along the first direction in the plan view, and all imaginary straight lines on a plane along the first and second directions, extending directly from the first circuit to the second circuit, intersect the force detection element in the plan view.

9. The force detecting device according to claim 8, wherein the sensor device further includes:

a first metal paste configured to electrically connect a wire of the first circuit and the first element; and a second metal paste configured to electrically connect a wire of the second circuit and the second element, wherein the first metal paste and the second metal paste are arranged along the second direction.

10. The force detecting device according to claim 8, wherein the sensor device further includes:

a first metal paste configured to electrically connect a wire of the first circuit and the first element; and a second metal paste configured to electrically connect a wire of the second circuit and the second element, wherein the first element is a first piezoelectric element, the second element is a second piezoelectric element, in the plan view of the base body, the first circuit and the second circuit are disposed in positions symmetrical with respect to a straight line passing a center of the force detection element and parallel to the second direction, and in the plan view of the base body, the first metal paste and the second metal paste are located on a first side parallel to the first direction of the force detection element.

11. The force detecting device according to claim 8, wherein the sensor device further includes:

a first metal paste configured to electrically connect a wire of the first circuit and the first element; and a second metal paste configured to electrically connect a wire of the second circuit and the second element, wherein the first element is a first piezoelectric element, the second element is a second piezoelectric element, in the plan view of the base body, the first circuit and the second circuit are disposed in positions point-symmetrical with respect to a center of the force detection element, in the plan view of the base body, the first metal paste is located on a first side parallel to the first direction of the force detection element, and in the plan view of the base body, the second metal paste is located on a second side opposite to the first side and parallel to the first direction of the force detection element.

12. The force detecting device according to claim 10, wherein
the first element outputs a first electric charge as the first signal,
the second element outputs a second electric charge as the second signal,
the first circuit converts the first electric charge into a voltage, and
the second circuit converts the second electric charge into a voltage.

13. The force detecting device according to claim 12, wherein
the first circuit includes at least one of a first resistor to which the first electric charge is input, a first capacitor configured to accumulate the first electric charge, or a first amplifier configured to amplify a voltage by the first electric charge, and
the second circuit includes at least one of a second resistor to which the second electric charge is input, a second capacitor configured to accumulate the second electric charge, or a second amplifier that amplifies a voltage by the second electric charge.

14. The force detecting device according to claim 10, wherein the first piezoelectric element and the second piezoelectric element respectively include quartz.

15. A robot comprising:
a base;
an arm connected to the base; and
a force detecting device connected to the arm, the force detecting device including:
a first substrate,
a second substrate,
a sensor device sandwiched by the first substrate and the second substrate; and
a bolt that fastens the first substrate and the second substrate,
wherein the sensor device includes:
a base body including a recess, the base body having a surface extending along first and second directions orthogonal to each other in a plan view, the recess having a first area, a second area, and a third area that are arranged along the first direction, the second area being sandwiched between the first area and the third area in the plan view;
a lid body configured to cover the base body to create an inner space having the recess;
a force detection element disposed in the second area of the recess, the force detection element including:
a first element that outputs a first signal according to a first factor of an external force applied to the force detection element in a first axis; and
a second element that is stacked on the first element and outputs a second signal according to a second factor of the external force in a second axis different from the first axis;
a first circuit disposed in the recessed section and configured to process the first signal; and
a second circuit disposed in the first area of the recess, the first circuit being configured to process the second signal,
wherein the force detection element is sandwiched between the first circuit and the second circuit along the first direction in the plan view, and all imaginary straight lines on a plane along the first and second directions, extending directly from the first circuit to the second circuit, intersect the force detection element in the plan view.

16. The robot according to claim 15, wherein the sensor device further includes:
a first metal paste configured to electrically connect a wire of the first circuit and the first element; and
a second metal paste configured to electrically connect a wire of the second circuit and the second element, wherein
the first metal paste and the second metal paste are arranged along the second direction.

17. The robot according to claim 15, wherein the sensor device further includes:
a first metal paste configured to electrically connect a wire of the first circuit and the first element; and
a second metal paste configured to electrically connect a wire of the second circuit and the second element, wherein
the first element is a first piezoelectric element,
the second element is a second piezoelectric element,
in the plan view of the base body, the first circuit and the second circuit are disposed in positions symmetrical with respect to a straight line passing a center of the force detection element and parallel to the second direction, and
in the plan view of the base body, the first metal paste and the second metal paste are located on a first side parallel to the first direction of the force detection element.

18. The robot according to claim 15, wherein the sensor device further includes:
a first metal paste configured to electrically connect a wire of the first circuit and the first element; and
a second metal paste configured to electrically connect a wire of the second circuit and the second element, wherein
the first element is a first piezoelectric element,
the second element is a second piezoelectric element,
in the plan view of the base body, the first circuit and the second circuit are disposed in positions point-symmetrical with respect to a center of the force detection element,
in the plan view of the base body, the first metal paste is located on a first side parallel to the first direction of the force detection element, and
in the plan view of the base body, the second metal paste is located on a second side opposite to the first side and parallel to the first direction of the force detection element.

19. The robot according to claim 17, wherein
the first element outputs a first electric charge as the first signal,
the second element outputs a second electric charge as the second signal,
the first circuit converts the first electric charge into a voltage, and
the second circuit converts the second electric charge into a voltage.

20. The robot according to claim 19, wherein
the first circuit includes at least one of a first resistor to which the first electric charge is input, a first capacitor configured to accumulate the first electric charge, or a first amplifier configured to amplify a voltage by the first electric charge, and
the second circuit includes at least one of a second resistor to which the second electric charge is input, a second capacitor configured to accumulate the second electric charge, or a second amplifier that amplifies a voltage by the second electric charge.

\* \* \* \* \*